United States Patent
Shozaki et al.

(10) Patent No.: US 8,531,687 B2
(45) Date of Patent: Sep. 10, 2013

(54) IMAGE FORMATION DEVICE, DISPLAY SCREEN SWITCHING METHOD, AND PROGRAM

(75) Inventors: Toshiya Shozaki, Osaka (JP); Ryoji Bando, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 462 days.

(21) Appl. No.: 12/720,194

(22) Filed: Mar. 9, 2010

(65) Prior Publication Data

US 2010/0231946 A1 Sep. 16, 2010

(30) Foreign Application Priority Data

Mar. 10, 2009 (JP) ................................. 2009-055997
Oct. 28, 2009 (JP) ................................. 2009-247592

(51) Int. Cl.
*G06F 15/00* (2006.01)
*G06K 1/00* (2006.01)

(52) U.S. Cl.
USPC .......................... 358/1.13; 358/1.15; 358/1.16

(58) Field of Classification Search
None
See application file for complete search history.

(56) References Cited

U.S. PATENT DOCUMENTS

2006/0221377 A1* 10/2006 Nishio .......................... 358/1.14
2008/0189775 A1* 8/2008 Fujita ................................. 726/7

FOREIGN PATENT DOCUMENTS

| JP | 63-45628 A | 2/1988 |
| JP | 2001-222406 A | 8/2001 |
| JP | 2002-330246 A | 11/2002 |

OTHER PUBLICATIONS

Office Action dated Mar. 6, 2012, issued in corresponding Japanese Patent Application No. 2009-247592, and an English Translation thereof. (7 pages).

* cited by examiner

*Primary Examiner* — Thierry Pham
(74) *Attorney, Agent, or Firm* — Buchanan Ingersoll & Rooney PC

(57) ABSTRACT

The present invention relates to an image formation device, a display screen switching method, and a program. Excellent operability with user friendliness is realized by appropriately controlling switching of a display screen without increasing a burden on an operating system. In order to accomplish this, an image formation device 1 for example includes: a panel manager 33 for controlling switching of a display screen to be displayed on a display unit 5; a system controller 32 for controlling a hardware section; and an application section 39 for executing a specific function by putting the hardware section into operation through the system controller 32, and for creating a display screen relating to the specific function. When the system controller 32 detects the occurrence of an event with the display screen created in the application section 39 being displayed on the display unit 5, the panel manager 33 requests the application section 39 to determine whether or not switching of a display screen should be made, and controls switching of a display screen to be displayed on the display unit 5 based on a result of the determination made by the application section 39.

15 Claims, 31 Drawing Sheets

FIG. 25

| SERVER LEVEL | TYPE OF EXTERNAL SERVER |
|---|---|
| 5 | EXTERNAL SERVER PROVIDED BY MANUFACTURER ITSELF OF IMAGE FORMATION DEVICE |
| 3 | EXTERNAL SERVER PROVIDED BY ALLIANCE WITH MANUFACTURER OF IMAGE FORMATION DEVICE |
| 1 | EXTERNAL SERVER PROVIDED INDEPENDENTLY OF MANUFACTURER OF IMAGE FORMATION DEVICE |

FIG. 29

| ERROR LEVEL | DETAILS OF ERROR |
|---|---|
| 4 | SERIOUS ERROR<br>(SHUTDOWN OF COOLING FAN, PHYSICAL DAMAGE OF STORAGE DEVICE, AND OTHERS) |
| 2 | MINOR ERROR<br>(SHORTAGE OF SHEETS, TONER SHORTAGE, SHEET JAM, AND OTHERS) |

IMAGE FORMATION DEVICE, DISPLAY SCREEN SWITCHING METHOD, AND PROGRAM

This application is based on the applications Nos. 2009-055997 and 2009-247592 filed in Japan, the contents of which are hereby incorporated by reference.

BACKGROUND OF THE INVENTION

1. Field of the Invention

The present invention relates to an image formation device, a display screen switching method, and a program. The present invention more specifically relates to a technique of controlling switching of a display screen to be displayed on a display unit capable of displaying various types of information.

2. Description of the Background Art

Publicly known conventional control methods of switching a display screen of a computer include such a technique as is introduced for example in Japanese Patent Application Laid-Open No. 2001-222406. According to this technique, a single operating system (OS) can simultaneously activate a plurality of windows, and a window is switched according to a user's input command, or by automatically interposing an active window. In this technique, an operating system that activates a plurality of windows determines which window should be active, and then a display screen is switched based on the determination.

Further, publicly known conventional methods of switching a window in a device with a multi-window display function include such a technique as is introduced for example in Japanese Patent Application Laid-Open No. 63-45628 (1988). According to this technique, a transition rule for causing a right to possess an input device to make a transition between windows is recorded. When an input is received from the input device, the right of possession is transferred to a next window according to the transition rule, thereby switching a window. For switching of a window, this technique requires the transition rule for switching a window to be stored in advance.

Image formation devices called by a name such as complex devices or MFPs (multifunction peripherals) have several functions including a copy function, a scan function, a print function and others. In recent years, there is a trend toward an increasing number of functions implemented in the image formation devices. In this situation, a user who uses an image formation device does not necessarily require all functions implemented in the image formation device. So, this type of image formation device has basic functions including a copy function, a scan function, a print function and others as standard functions implemented in advance therein. Another function may be added as an extended function to the image formation device.

This image formation device has an operating system for controlling hardware sections including a scanner section, a printer section and others. Functions such as a copy function or a scan function are each implemented as an application program. As these application programs are started by the operating system, the corresponding functions are become available in the image formation device. So, in order to add an extended function to the image formation device, an application program corresponding to this extended function should be installed in the image formation device.

When the extended function is added to image formation device, a display screen that can be displayed on an operational panel of the image formation device includes a display screen relating to standard functions, and a display screen relating to the added extended function. In the conventional image formation device, an operating system controls switching among these display screens.

However, if an operating system always makes a determination as to switching of a display screen to be displayed on an operational panel of the above-described image formation device in which an application program corresponding to an extended function can be installed, a burden on the operating system may increase. As an example, while the added extended function is in operation in the image formation device, and a display screen relating to this extended function is displayed on the operational panel, the operating system may detect generation of an error in a scanner section or in a printer section. In this case, in order for the operating system to appropriately determine whether or not a display screen to be displayed on the operational panel should be switched to an error screen, the operating system should precisely figure out the substance of processing of the extended function. So, a function to figure out the substance of processing of the extended function to be added later should be incorporated in advance in the operating system. This also increases a burden on the operating system.

Meanwhile, when generation of an error in the scanner section or in the printer section is detected during the operation of the extended function, the operating system may forcibly switch a display screen on the operational panel to the error screen without any consideration of the substance of processing of the extended function. This may reduce the increase of burden on the operating system. In this case, however, the display screen on the operational panel is forcibly switched to the error screen even if the extended function is not affected continuance of its operation by the error generated in the scanner section or in the printer section. So, a user who uses the extended function confronts the unnecessary screen switching that was forcibly made, resulting in the reduction in operability of the extended function.

Besides, a recent image formation device can make access to an external server such as a Web server through a network, so that a display screen created in the external server can be displayed on an operational panel of the image formation device. In this case, the display screen created in the external server can be displayed as an operation screen when a user uses a standard function or an extended function of the image formation device. So, the user is allowed to adapt the design of a display screen at the user's choice and make the operational panel displaying the same, for example, by modifying a display screen created in the external server with operation keys of colorful designs and the like.

However, the external server is not necessarily a reliable device provided by a manufacturer of the image formation device. So, there arises a problem concerning the reliability of a display screen created in the external server.

This problem becomes a serious issue especially when an error is generated in the image formation device. As an example, when an error screen created in the external server does not suitably provide the precise details of the error or a way to handle the error, a user cannot take appropriate actions against the error. As a result, the error in the image formation device remains for a long time before it is eliminated, causing the deterioration of the reliability of the image formation device itself. In order to avoid this, each time an error is generated in the image formation device, a display screen to be displayed on an operational panel may forcibly be switched to an error screen created in the image formation device. In this case, however, a display screen is switched to the error screen created in the image formation device even when the error is a minor error such as shortage of sheets. This causes a change in the design of a display screen, so uniformity in the screen design is broken.

In addition, when a display screen created in the external server is displayed on the operational panel, the external server cannot recognize an extended function added to the image formation device, the particulars of other specifications or the like. So, if a display screen created in the external server is displayed on the operational panel as it is, sometimes an item that cannot be set in the image formation device is shown to be settable, or sometimes a combination of two or more items which cannot be set simultaneously in the image formation device is shown to be available as a target of simultaneous setting. These also lead a problem that reduces operability for a user to operate the image formation device.

SUMMARY OF THE INVENTION

The present invention is intended to provide an image formation device, a display screen switching method, and a program that solve the above-described conventional problems. The present invention is intended to realize excellent operability with user friendliness without increasing a burden on an operating system. The present invention is also intended to realize excellent operability with user friendliness by displaying a suitable display screen on an operational panel even when the display screen is created in an external server.

First, the present invention is directed to an image formation device.

According to one aspect of the image formation device, the image formation device comprises: a display unit capable of displaying various types of information; a screen controller for controlling switching of a display screen to be displayed on the display unit; a hardware section for executing a specific function; a system controller for controlling the hardware section; and an application section for executing the specific function by putting the hardware section into operation through the system controller, and for creating a display screen relating to the specific function. When the system controller detects the occurrence of an event in the hardware section with the display screen created in the application section being displayed on the display unit, the screen controller requests the application section to determine whether or not switching of a display screen to be displayed on the display unit should be made, and controls switching of a display screen to be displayed on the display unit based on a result of the determination made by the application section.

According to another aspect of the image formation device, the image formation device comprises: a display unit capable of displaying various types of information; a screen controller for switching a display screen to be displayed on the display unit; a hardware section for executing a specific function; a system controller for controlling the hardware section; a screen creation part for creating an error screen responsive to an error generated in the hardware section, and for outputting the error screen to the screen controller; an application section for executing the specific function by putting the hardware section into operation through the system controller; a screen acquisition part for acquiring, from an external server with which the at least one hardware section can communicate through the system controller, a display screen to be displayed on the display unit when the specific function is executed, and for outputting the acquired display screen to the screen controller; and a switching determination part for determining whether an error screen to be displayed responsive to the error should be acquired from the external server by the screen acquisition part, or the error screen responsive to the error created in the screen creation part should be displayed, and for switching a display screen to be displayed on the display unit to the error screen by controlling the screen controller based on a result of its determination, the determination and the switching being made when the system controller detects generation of the error in the hardware section with the display screen acquired by the screen acquisition part being displayed on the display unit.

According to still another aspect of the image formation device, the image formation device comprises: a display unit capable of displaying various types of information; a screen controller for controlling switching of a display screen to be displayed on the display unit; a hardware section for executing a specific function; a system controller for controlling the hardware section; an application section for executing the specific function by putting the hardware section into operation through the system controller; a screen acquisition part for acquiring, from an external server with which the hardware section can communicate through the system controller, a display screen to be displayed on the display unit when the specific function is executed; and a display screen processing part for creating a display screen in which the display style of a setting item is changed by executing some image processing on the setting item, and for outputting the created display screen to the screen controller while the setting item contained in the display screen acquired by the screen acquisition part cannot be set when the specific function is executed.

Second, the present invention is directed to a display screen switching method.

According to an aspect of the display screen switching method, a selective switching among display screens created in a plurality of application sections is made, and the switched display screen is displayed on a display unit. The display screen switching method comprises the steps of: (a) acquiring a display screen created in an application section selected from the plurality of application sections, and displaying the acquired display screen on the display unit; (b) when the occurrence of an event is detected with the display screen created in the selected application section being displayed on the display unit, requesting the selected application section to determine whether or not a display screen to be displayed on the display part should be switched; and (c) controlling switching of a display screen to be displayed on the display unit based on a result of the determination made by the selected application section.

Third, the present invention is directed to a program stored on a computer readable medium.

According to an aspect of the program, the program is executed by a computer to make a selective switching among display screens created in a plurality of application sections, and to display the switched display screen on a display unit. The program causes the computer to execute processing comprising the steps of: acquiring a display screen created in an application section selected from the plurality of application sections, and displaying the acquired display screen on the display unit; when the occurrence of an event is detected with the display screen created in the selected application section being displayed on the display unit, requesting the selected application section to determine whether or not a display screen to be displayed on the display unit should be switched; and controlling switching of a display screen to be displayed on the display unit based on a result of the determination made by the selected application section.

BRIEF DESCRIPTION OF THE DRAWINGS

FIG. 25 shows exemplary correlations between a server level and an external server;

FIG. 29 shows exemplary error levels determined by error assessment of the fourth preferred embodiment;

DESCRIPTION OF THE PREFERRED EMBODIMENTS

Figure 1:
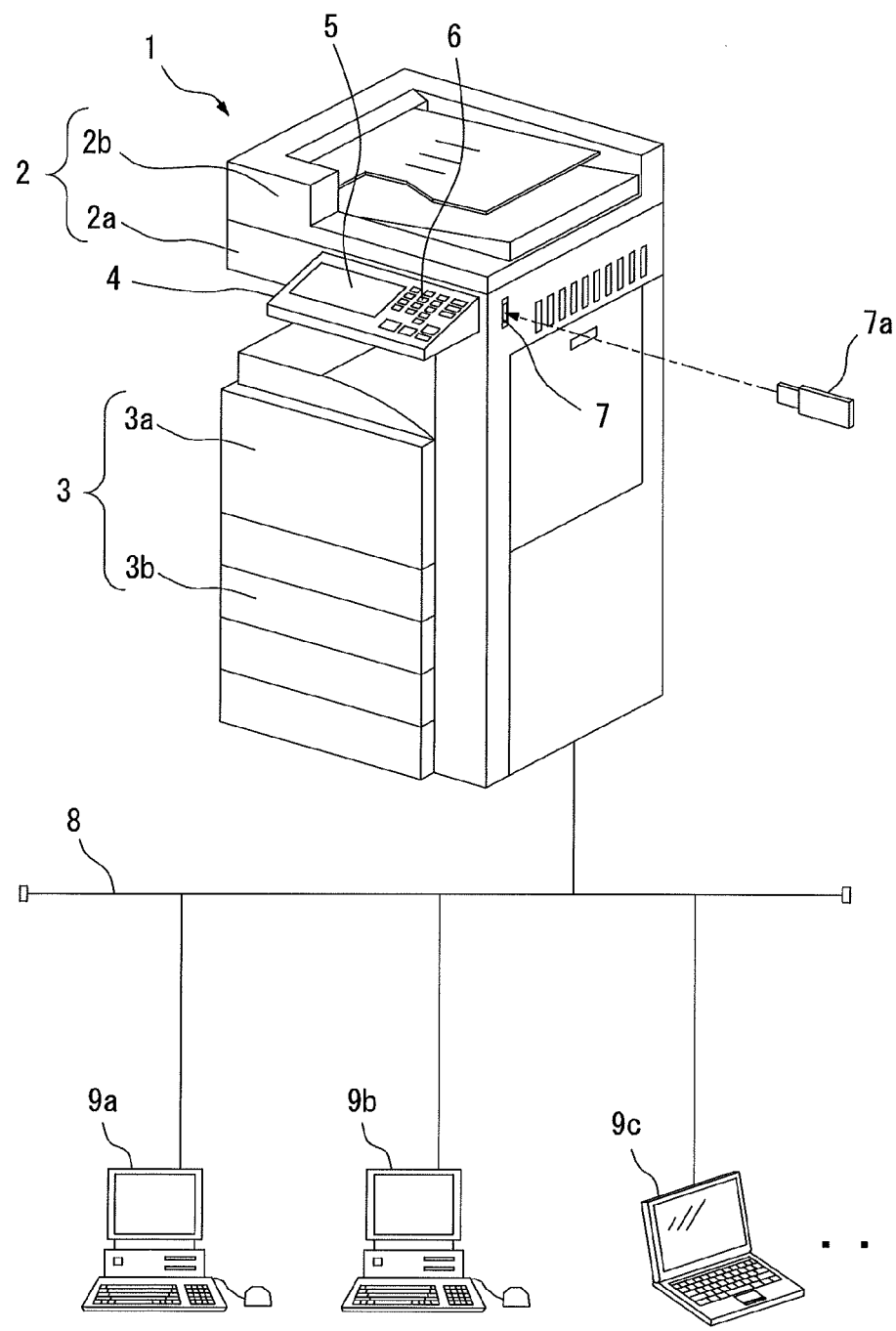
FIG. 1 shows the configuration of a network to which an image formation device is connected.

Preferred embodiments of the present invention are described in detail below with reference to figures. In the description given below, those elements which are shared in common among the preferred embodiments are represented by the same reference numerals, and are not discussed repeatedly for the same description.

First Preferred Embodiment

FIG. 1 shows the configuration of a network to which an image formation device 1 according to a first preferred embodiment of the present invention is connected. The image formation device 1 is a device generally called by a name such as a complex device or MFPs having several functions including a copy function, a scan function, a print function and others as standard functions. The image formation device 1 includes a scanner section 2 provided at the upper part of the device body, and a printer section 3 provided at the lower part of the device body. The scanner section 2 includes an image reading unit 2a for optically reading the images of documents, and an automatic document feeder (ADF) 2b capable of holding a plurality of documents placed thereon. Each page of the documents placed on the automatic document feeder 2b is automatically fed one by one to the image reading unit 2a. The printer section 3 includes an image formation unit 3a for forming an image by transferring a toner image to a printing medium such as an output sheet, and a sheet feed part 3b for supplying output sheets one by one to the image formation unit 3a.

The image formation device 1 has an operational panel 4 operable by a user, and which is arranged on the front side of the scanner section 2. The operational panel 4 includes a display unit 5 for displaying various types of information to a user, and an operation unit 6 through which the user performs input operation to the image formation device 1. The display unit 5 is formed, for example, by a liquid crystal display that can display color images. As an example, a display screen such as an operation guide screen relating to a function selected by a user is displayed on the display unit 5 when the user uses the image formation device 1. The operation unit 6 is formed by a plurality of operation keys including touch panel keys arranged on a surface of the display unit 5, and a plurality of push-button keys arranged around the display unit 5. The user can select a function the user intends to use from the several functions by operating the operation unit 6. Further, as the user performs input operation while viewing a display screen displayed on the display unit 5, the user can input settings relating to the selected function, or can give instructions to start en execution of a job.

The image formation device 1 has an external interface 7 such as a USB interface arranged on its side surface. An external storage device 7a such as a USB memory can be connected to the external interface 7.

As shown in FIG. 1, the image formation device 1 described above is connected to a network 8 such as a LAN. In addition to the image formation device 1, information processing devices 9a, 9b and 9c formed from personal computers and the like are connected to the network 8. By way of example, after receiving print data from the information processing device 9a, 9b or 9c through the network 8, the image formation device 1 starts the print function to execute print output.

When an extended function is added to the image formation device 1 in the configuration described above, an application program corresponding to the extended function is downloaded from the information processing device 9a, 9b or 9c, or from others through the network 8, and is then installed in the image formation device 1. Alternatively, the external storage device 7a storing therein the application program corresponding to the extended function may be connected to the external interface 7 of the image formation device 1. In this case, the application program is installed from the external storage device 7a into the image formation device 1. The application program may be installed in the image formation device 1 in other ways.

Figure 2:
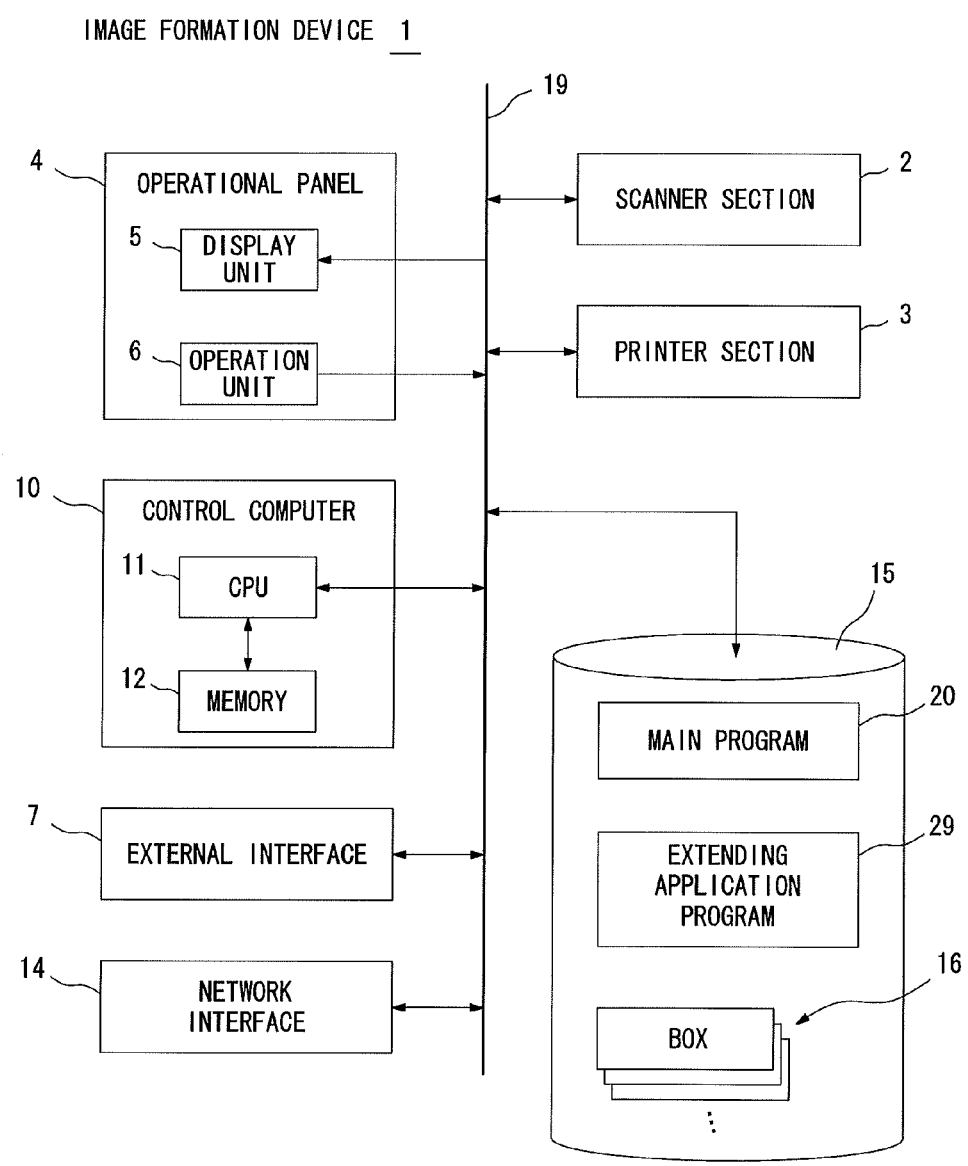
FIG. 2 is a block diagram showing the hardware configuration of the image formation device.

FIG. 2 is a block diagram showing the hardware configuration of the image formation device 1. In addition to the scanner section 2, the printer section 3, the operational panel 4 and the external interface 7 described above, the image formation device 1 includes as components of its hardware configuration a control computer 10, a network interface 14, and a storage device 15. These components are connected to each other through a data bus 19 in a manner that allows data input and output to and from each component. The image formation device 1 puts these hardware sections into operation to execute processing based on various functions including standard functions and extended functions.

The network interface 14 connects the image formation device 1 to the network 8. So, the image formation device 1 is allowed to establish data communications with the information processing devices 9a, 9b and 9c through the network 14.

The storage device 15 is a nonvolatile storage device such as a hard disk drive, for example. The storage device 15 stores therein a main program 20 installed in advance in the image formation device 1, and an extending application program 29 that is installed when the corresponding extended function is to be added to the image formation device 1.

The storage device 15 has two or more storage regions 16 each of which is called by a name such as a BOX. As an example, each of the storage regions 16 is individually allocated to each user who uses the image formation device 1, or is enabled to be shared by several users. When image data received from the information processing device 9a, 9b or 9c through the network 8 contains information designating at least one of the storage regions 16, the image formation device 1 can save the received image data into the designated at least one of the storage regions 16. With the scan function that the image formation device 1 has as one of its standard functions, image data read by the scanner section 2 can be saved into at least one of the storage regions 16 designated by a user.

The control computer 10 reads programs stored in the storage device 15 and executes the read programs, thereby controlling the scanner section 2, the printer section 3, the operational panel 4, the external interface 7, the network interface 14, and the storage device 15. This puts each of these hardware sections into operation to make each function available in the image formation device 1. The control computer 10 includes a CPU 11 and a memory 12. The CPU 11 executes computations based on the read programs. The memory 12 stores therein temporary data and the like used by the CPU 11 for executing computations.

Figure 3:
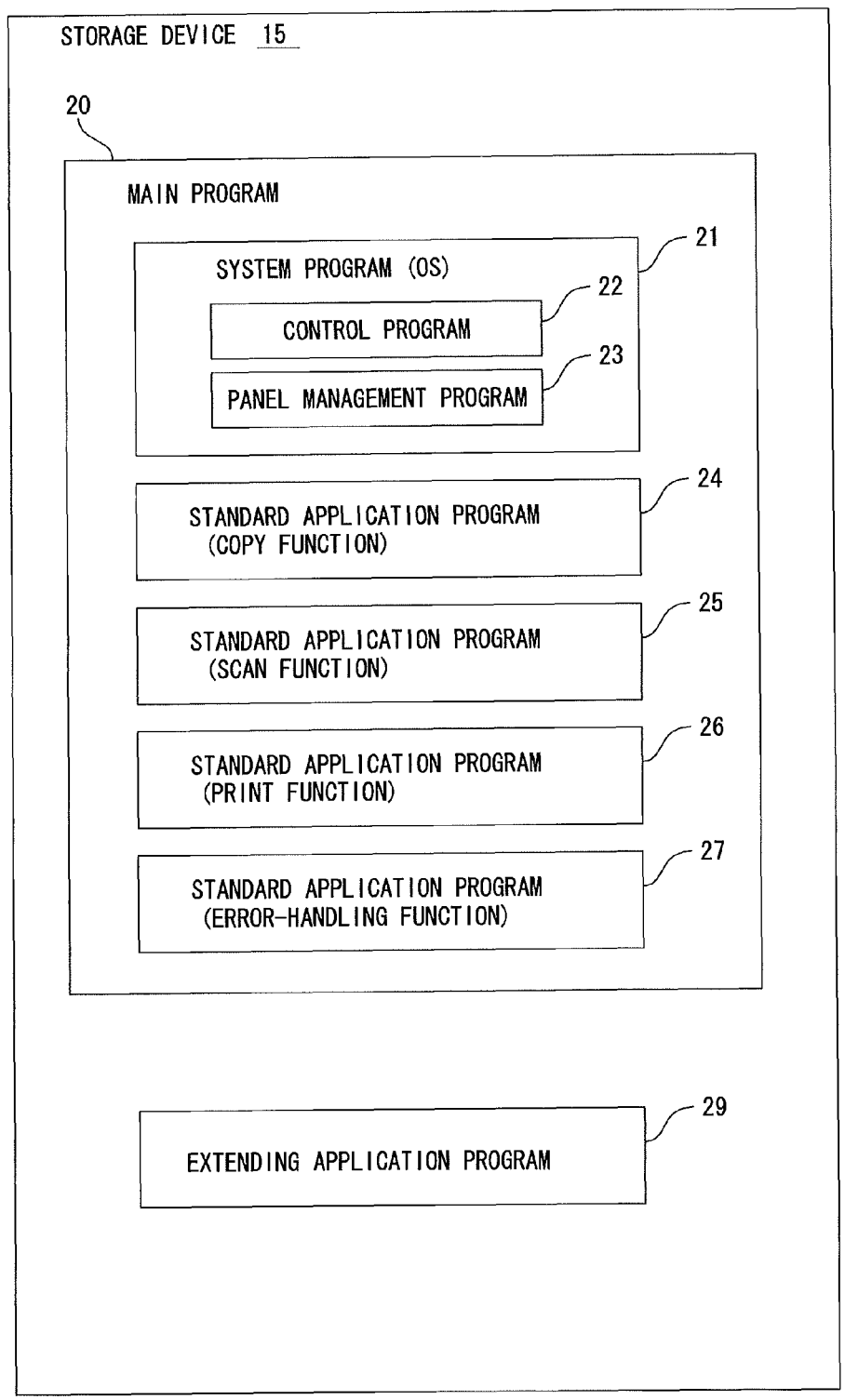
FIG. 3 shows a main program and an extending application program executed by a control computer.

FIG. 3 shows the main program 20 and the extending application program 29 executed by the control computer 10. As shown in FIG. 3, the main program 20 contains a system program 21 that functions as an operating system (OS) of the image formation device 1, and several standard application programs 24, 25, 26 and 27 that become executable under the condition of that the system program 21 is running. The system program 21 contains a control program 22 and a panel management program 23. The control program 22 is a basic program for controlling mainly the scanner section 2, the printer section 3, the external interface 7, the network interface 14, and the storage device 15. The panel management program 23 is a basic program for mainly causing the operational panel 4 to function as a user interface.

Each of the standard application programs 24 to 27 is intended to realize the corresponding functions the image formation device 1 has as its standard functions. In the example of FIG. 3, the standard application programs 24, 25, 26 and 27 respectively correspond to the copy function, the scan function, the print function, and an error handling function. Each of the standard application programs 24 to 27 contains a specific procedure for executing a processing corresponding to each function in the image formation device 1, information about a display screen to be displayed on the display unit 5 of the operational panel 4 for a user to use each function, and others.

As well as the standard application programs 24 to 27; the extending application program 29 is become executable while the system program 21 is caused by the control computer 10 to run. The extending application program 29 corresponds to an extended function to be added to the image formation device 1. The extending application program 29 contains a specific procedure for executing a processing corresponding to the extended function in the image formation device 1, information regarding a display screen to be displayed on the display unit 5 of the operational panel 4 for a user to use the extended function, and others.

The extended function may, for example, be a "Scan To" function for transmitting image data read from a document by driving the scanner section 2 to the information processing device 9a, 9b or 9c connected to the network 8 through the network interface 14. The extended function may alternatively be a character recognition function such as OCR (optical character recognition) for applying a character recognition processing to image data read from a document by driving the scanner section 2, converting to data in text format, and then saving into at least one of the storage regions 16. The extended function may also be a user authentication function for executing a fingerprint authentication or vein authentication. When such user authentication function is used as the extended function, a device for reading fingerprint information or vein pattern information is required in addition to the image formation device 1 as an additional hardware section together with installation of the extending application program 29. In the first preferred embodiment, the extended function that can be added to the image formation device 1 is not limited to those described above, but other functions may be employed as the extended function.

When the image formation device 1 is turned on, the control computer 10 first reads and executes the system program 21. Next, with the system program 21 running, the control computer 10 sequentially reads and executes the standard application program 24 to 27, and the extending application program 29. After a processing executed by each application program such as initialization is ended, all the programs are in a resident state, so that all the functions including the standard functions and the extended function become available in the image formation device 1.

The configuration of a system made up by executing the main program 20 in the image formation device 1 is described next. The system configuration described next is in a state where the control computer 10 executes the system program 21 and the standard application programs 24 to 27 in the image formation device 1.

Figure 4:
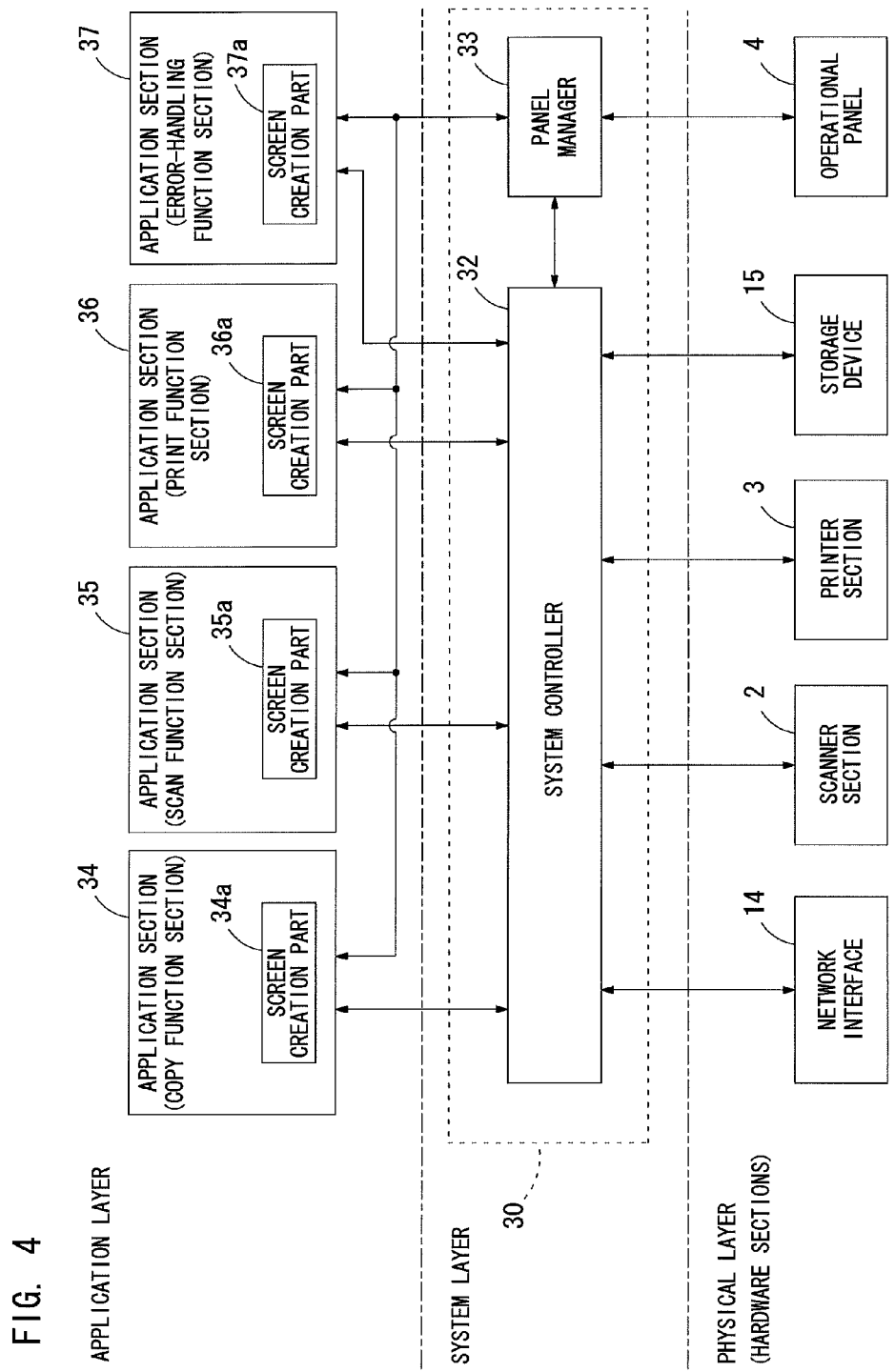
FIG. 4 is a block diagram showing a system configuration of first preferred embodiment of the present invention after the main program is started in a state where an extended function is yet to be added to the image formation device.

FIG. 4 is a block diagram showing a system configuration after the programs are started in a state where the extended function is yet to be added to the image formation device 1. After each program is started in the image formation device 1, a system with three layers including a physical layer, a system layer and an application layer is configured as shown in FIG. 4. The physical layer contains hardware sections including the network interface 14, the scanner section 2, the printer section 3, the storage device 15, the operational panel 4, and others. An operating system 30 put into operation by the start of the system program 21 is positioned in the system layer higher than the physical layer, and controls each hardware section in the physical layer. Application sections 34, 35, 36 and 37 respectively realized by the standard application programs 24, 25, 26 and 27 are positioned in the application layer higher than the system layer.

The application section 34 is a copy function section realized by the standard application program 24, and includes a screen creation part 34*a* for creating a display screen relating to the copy function. The application section 35 is a scan function section realized by the standard application program 25, and includes a screen creation part 35*a* for creating a display screen relating to the scan function. The application section 36 is a print function section realized by the standard application program 26, and includes a screen creation part 36*a* for creating a display screen relating to the print function. The application section 37 is an error-handling function section realized by the standard application program 27, and includes a screen creation part 37*a* for creating a display screen relating to the error handling function. Each of the application sections 34, 35, 36 and 37 control each hardware section in the physical layer through the operating system 30, thereby executing processing based on each function.

The operating system 30 includes a system controller 32 put into operation by the start of the control program 22, and a panel manager 33 put into operation by the start of the panel management program 23. The system controller 32 controls mainly the hardware sections except the operational panel 4 in the physical layer (in the example of FIG. 4, the network interface 14, the scanner section 2, the printer section 3, and the storage device 15). As an example, when a copy job is to be executed under instructions from the copy function section of the application section 34, the system controller 32 drives the scanner section 2 and the printer section 3 according to a procedure input from the application section 34, thereby controlling reading of a document and output operation. When a scan job is to be executed under instructions from the scan function section of the application section 35, the system controller 32 drives the scanner section 2 and the storage device 15 according to a procedure input from the application section 35, thereby controlling reading of a document and recording of image data. Further, when a print job is to be executed under instructions from the print function section of the application section 36, the system controller 32 drives the printer section 3 according to a procedure input from the application section 36, thereby controlling output operation.

The system controller 32 can process a plurality of jobs in parallel. As an example, it is assumed that the print function section of the application section 36 gives instructions to execute a print job while a scan job is executed under instructions from the scan function section of the application section 35. In this case, while the scan job is executed with the scanner section 2 and the storage device 15 in the physical layer, the print job is executed with only the printer section 3 in the physical layer, so that these two jobs can be processed in parallel. So, in this case, the system controller 32 processes a plurality of jobs in parallel.

The system controller 32 monitors the hardware sections including the network interface 14, the scanner section 2, the printer section 3, the storage device 15, and others all the time. When an event occurs in any of the hardware sections, the system controller 32 detects the occurrence of the event. In the first preferred embodiment, error generation is given as an example of an event detected by the system controller 32. When the generation of an error is detected in a hardware section, the system controller 32 urgently stops the hardware section in which the error is generated, if necessary. Then, the system controller 32 notifies the panel manager 33 of the error generation. By way of example, when a document jam is generated while the scanner section 2 is in operation, the system controller 32 urgently stops the operation of the scanner section 2, and notifies the panel manager 33 of the error generation in the scanner section 2. Alternatively, when an output sheet jam is detected while the printer section 3 is in operation, the system controller 32 urgently stops the operation of the printer section 3, and notifies the panel manager 33 of the error generation in the printer section 3.

Figure 5:
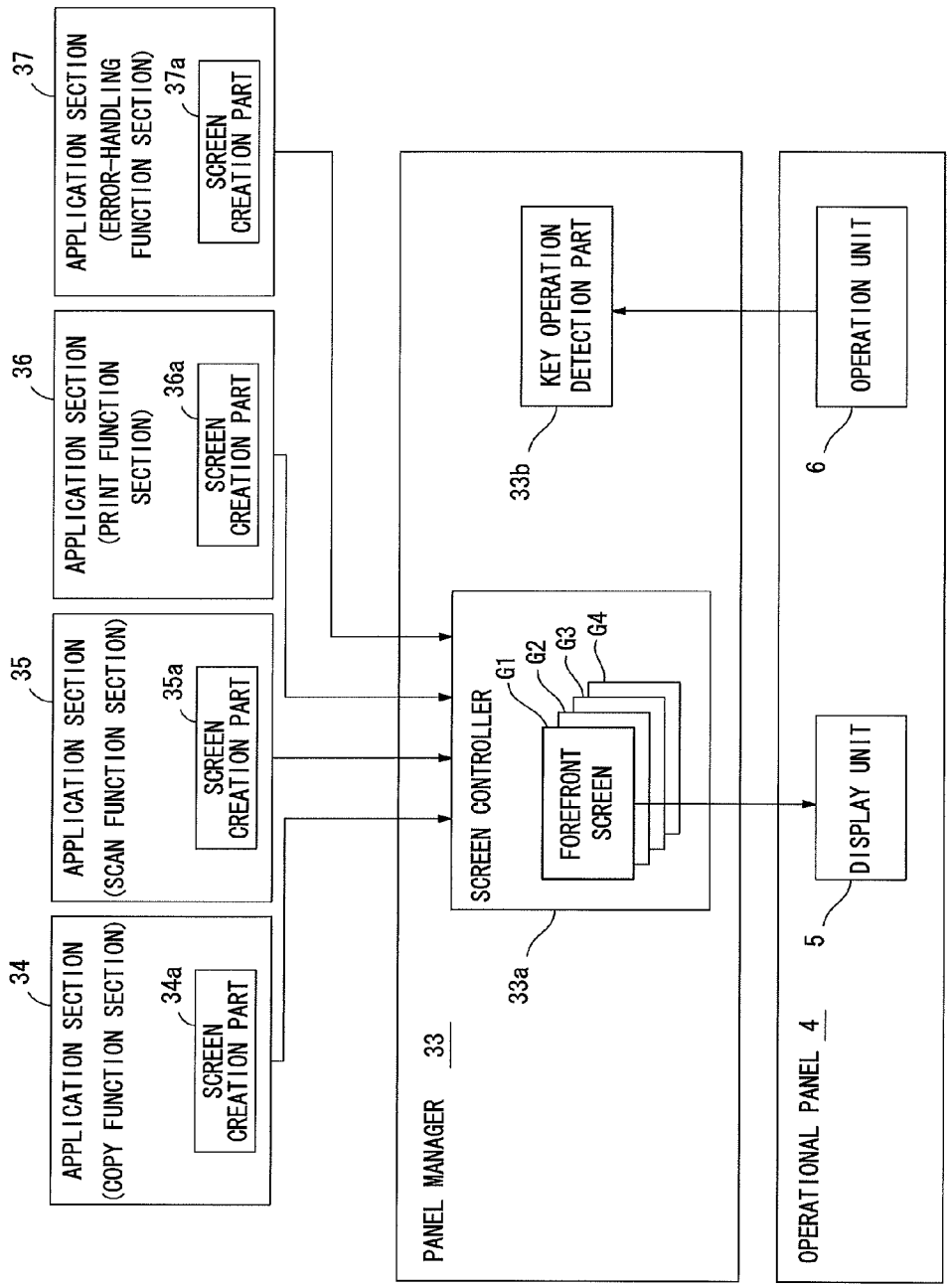
FIG. 5 is a block diagram showing an exemplary idea of the specific configuration of a panel manager in the system configuration shown in FIG. 4.

The panel manager 33 mainly manages and controls the operational panel 4 of the hardware sections in the physical layer. FIG. 5 is a block diagram showing an exemplary idea of the specific configuration of the panel manager 33. The panel manger 33 includes a screen controller 33*a* for controlling a screen to be displayed on the display unit 5 of the operational panel 4, and a key operation detection part 33*b* for detecting a key operation on the operation unit 6 of the operational panel 4.

The screen controller 33*a* inputs display screens relating to each function that are respectively created in the screen creation parts 34*a*, 35*a*, 36*a* and 37*a* in the plurality of application sections 34, 35, 36 and 37 running on the operating system 30. Then, the screen controller 33*a* selectively switches a display screen to be displayed on the display unit 5 of the operational panel 4. As an example, as shown in FIG. 5, the screen controller 33*a* manages display screens G1, G2, G3 and G4 received from the plurality of application sections 34, 35, 36 and 37 respectively in a layered structure in which the display screens G1, G2, G3 and G4 are superimposed on each other. The screen controller 33*a* outputs the display screen G1 at the forefront in the layered structure as an active display screen to the display unit 5, and manages the display screens G2, G3 and G4 not placed at the forefront in the layered structure as background display screens. When the system controller 32 executes a plurality of jobs in parallel, for example, the screen controller 33a sets a display screen relating to any one of the jobs as an active display screen, and sets display screens relating to the other jobs as background display screens.

The key operation detection part 33b determines which operation key was operated in response to user's operation of the operation unit 6 of the operational panel 4. As an example, when a user makes an operation to select the copy function from the several functions, the key operation detection part 33b detects the operation, and outputs information indicating that the copy function was selected to the screen controller 33a. In response, the screen controller 33a makes a display screen created in the screen creation part 34a of the application section 34 active, and then outputs this display screen to the display unit 5 of the operational panel 4. As a result, the display screen relating to the copy function is displayed on the display unit 5. Thus, the user can make an operation such as a setting operation relating to the copy function while viewing the display screen relating to the copy function displayed on the display unit 5. When the user's key operation is detected while the display screen relating to the copy function is being active, the key operation detection part 33b outputs key information to the application section 34. Thus, the application section 34 is allowed to execute a setting processing relating to the copy function based on the user's setting operation. Moreover, the application section 34 creates a display screen incorporating the setting thereby made and outputs the display screen to the screen controller 33a, so that the user's setting operation can be incorporated in the display screen on the display unit 5.

While the application sections 34, 35 and 36 are executing their respective jobs, display screens responsive to the progresses of the corresponding jobs are respectively created by the screen creation parts 34a, 35a and 36a. One of the display screens that is made active by the screen controller 33a is displayed on the display unit 5 of the operational panel 4, thereby displaying the progress of the corresponding job.

When receiving a notification indicating generation of an error from the system controller 32, the panel manager 33 requests the application section 37 as the error-handling function section to create a display screen responsive to the details of the error. Then, the panel manager 33 makes a display screen for error notification created in the screen creation part 37a of the application section 37 active, thereby switching a screen to be displayed on the display unit 5 of the operational panel 4 to an error screen.

As described above, in the image formation device 1 of the first preferred embodiment, when a document jam is generated in the scanner section 2 or in the printer section 3 during execution of a job based for example on the copy function, the scan function or the print function as one of the standard functions, the panel manager 33 switches a display screen to be displayed on the display unit 5 of the operational panel 4 from a screen indicating the progress of the job to an error screen. This is because, with regard to the standard functions implemented in advance in the image formation device 1, the panel manager 33 can determine whether or not an error affects the execution of jobs of the standard functions at the time of generation of the error. So, the panel manager 33 makes such a determination to control switching of a screen.

Figure 6:
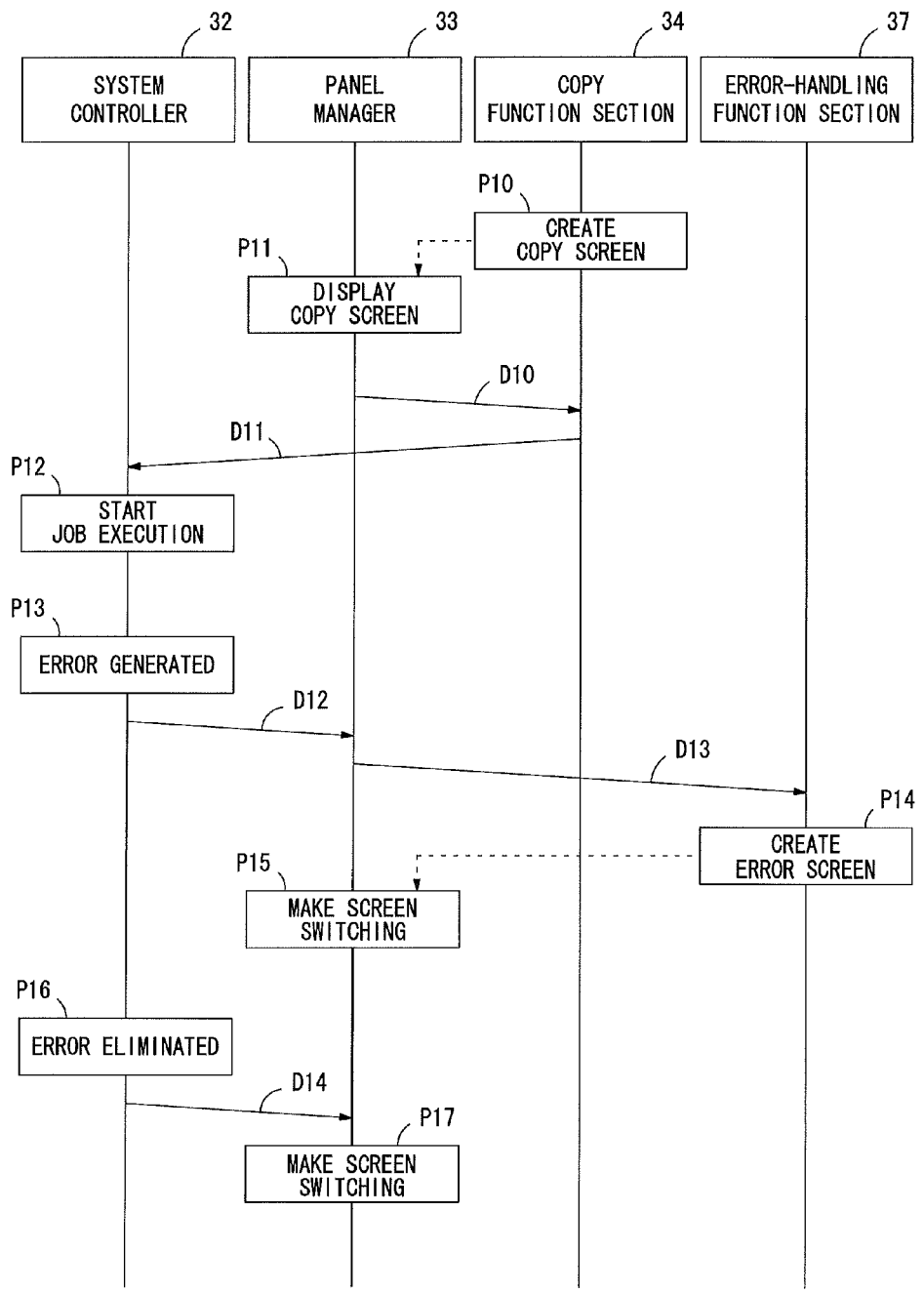
FIG. 6 explains an example of a processing executed in each section of the first preferred embodiment when an error is generated during execution of a job of a copy function as a the standard function.

FIG. 6 explains an example of a process executed in each section when an error is generated during execution of a job of the copy function as a standard function. In the case of FIG. 6, the error generated during the execution of the job of the copy function affects the job. As explained in FIG. 6, a copy screen is created in the copy function section as the application section 34 (process P10). After the copy function is selected in response to user's operation made on the operational panel 4, the panel manager 33 displays the copy screen created in the copy function section 34 on the display unit 5 of the operational panel 4 (process P11). The user operates the operational panel 4 to give instructions to start execution of a job. In response, the panel manager 33 outputs key information D10 of an operation key operated by the user to the copy function section 34. After inputting the key information D10, the copy function section 34 determines that the input key information D10 is instructions to start the execution of the job. Then, the copy function section 34 outputs information D11 containing setting information, a procedure and the like of the job to the system controller 32. In response, the system controller 32 drives and controls the scanner section 2 and the printer section 3 to start the execution of the copy job (process P12).

When detecting an error such as a document jam generated in the scanner section 2 or an output sheet jam generated in the printer section 3 (process P13) after the execution of the copy job is started, the system controller 32 stops the execution of the copy job, and outputs a notification D12 for notifying the error generation to the panel manager 33. After inputting the error generation notification D12, the panel manager 33 outputs a request D13 for an error screen to the error-handling function section as the application section 37. In response, the error-handling function section 37 creates an error screen responsive to the generated error (process P14). The error screen thereby created contains information for notifying the error generation, and information for providing guidance to eliminate the error.

After transmitting the error screen request D13 to the error-handling function section 37, the panel manager 33 switches a display screen to be displayed on the display unit 5 of the operational panel 4 from the copy screen created in the copy function section 34 to the error screen created in the error-handling function section 37 (process P15). Thus, the user is able to be noticed the error generation, and is able to take action to eliminate the error based on the guidance displayed on the display screen.

When determining that the error has been eliminated (process P16), the system controller 32 restarts the execution of the copy job, and outputs a notification D14 of error elimination to the panel manager 33. As inputting the error elimination notification D14, the panel manager 33 switches a display screen to be displayed on the display unit 5 of the operational panel 4 from the error screen created in the error-handling function section 37 to the copy screen created in the copy function section 34 (process P17). As a result, a display screen of the operational panel 4 is back to a screen indicating the progress of the copy job, so that the user can see the progress of the restarted job.

Figure 7:
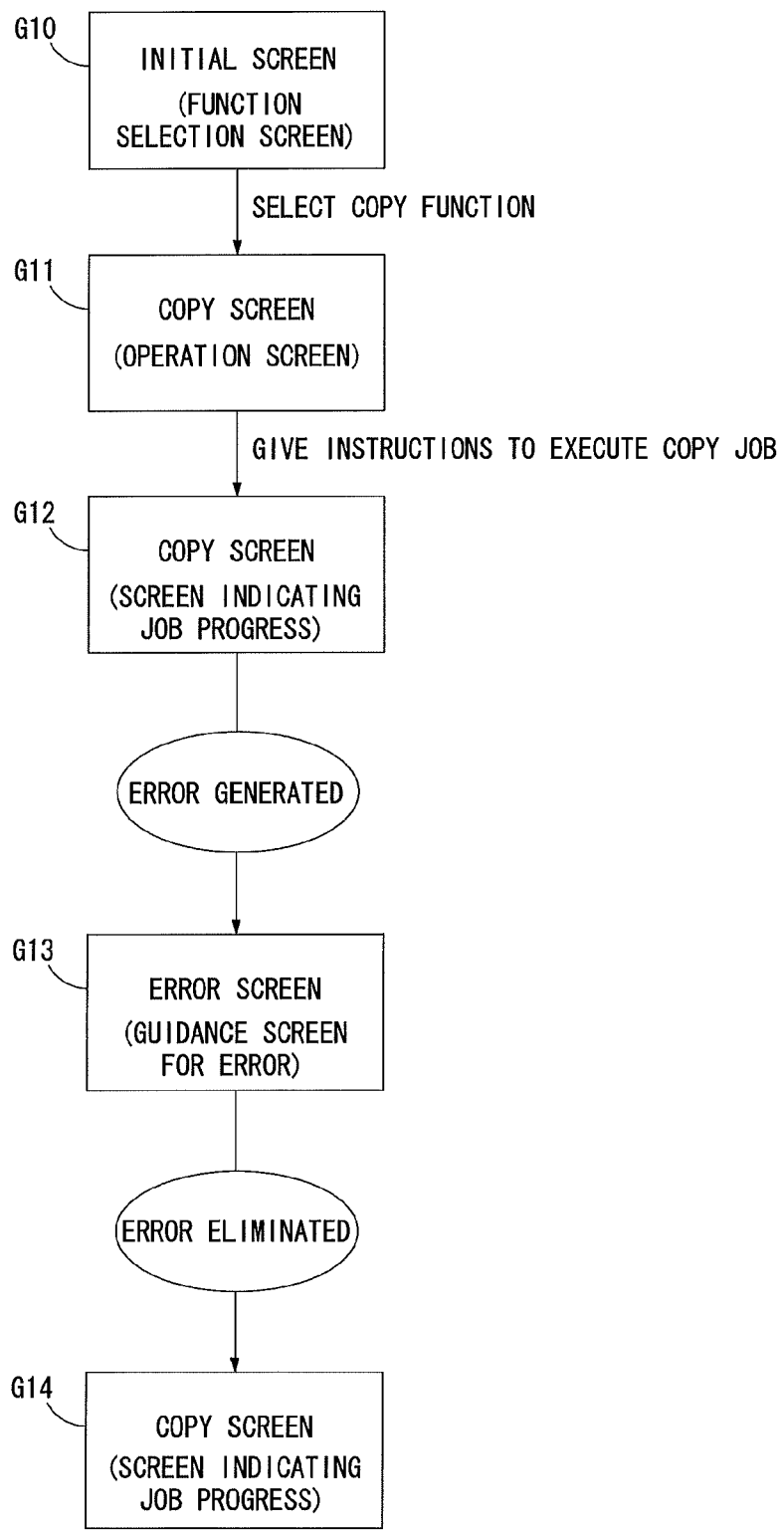
FIG. 7 is an example explaining how a screen displayed on a display unit of an operational panel changes in response the processes explained in FIG. 6.

FIG. 7 is an example explaining how a screen displayed on the display unit 5 of the operational panel 4 changes in response to the processes explained in FIG. 6. First, an initial screen G10 is displayed on the display unit 5 of the operational panel 4. The initial screen G10 is, for example, created by the panel manager 33, and serves as a function selection screen for prompting a user to select a function. When the user makes an operation to select, for example, the copy function while the initial screen G10 is displayed on the operational panel 4, a display screen to be displayed on the display unit 5 changes from the initial screen G10 to a copy screen G11 relating to the copy function under switching control of screens by the panel manager 33. The copy screen G11 is an operation screen for allowing the user to make a setting operation relating to the copy function, for example. After the user completes the setting operation or the like and gives instructions to execute the copy job, the copy screen G11 displayed on the display unit 5 is changed to a copy screen G12 indicating the progress of the job. This screen change is realized by the screen creation part 34a of the application section 34. So, the panel manager 33 does not execute screen switching at this time.

When the system controller 32 detects generation of an error such as a sheet jam during the execution of the copy job, it becomes impossible to continue the execution of the copy job. Thus, the panel manager 33 switches a display screen to be displayed on the display unit 5 from the copy screen G12 to an error screen G13. The error screen G13 is a guidance screen for providing a way to handle the error generated in the image formation device 1. After the user takes appropriate action to eliminate the error, the execution of the copy job is restarted. Then, the panel manager 33 switches a display screen to be displayed on the display unit 5 from the error screen G13 to a copy screen G14. The copy screen G14 which is a display screen relating to the copy function is the same as the copy screen G12 displayed before generation of the error.

As described above, in the first preferred embodiment, it is assumed that only the standard functions implemented in the image formation device 1 and an event occurs in any of the hardware sections in the physical layer. In this case, the panel manager 33 determines whether or not a display screen to be displayed on the display unit 5 should be switched based on the details of the event, and then executes screen switching based on a result of the determination.

The configuration of a system described next is in a state where the control computer 10 is executing the system program 21, the standard application programs 24 to 27, and the extending application program 29.

Figure 8:
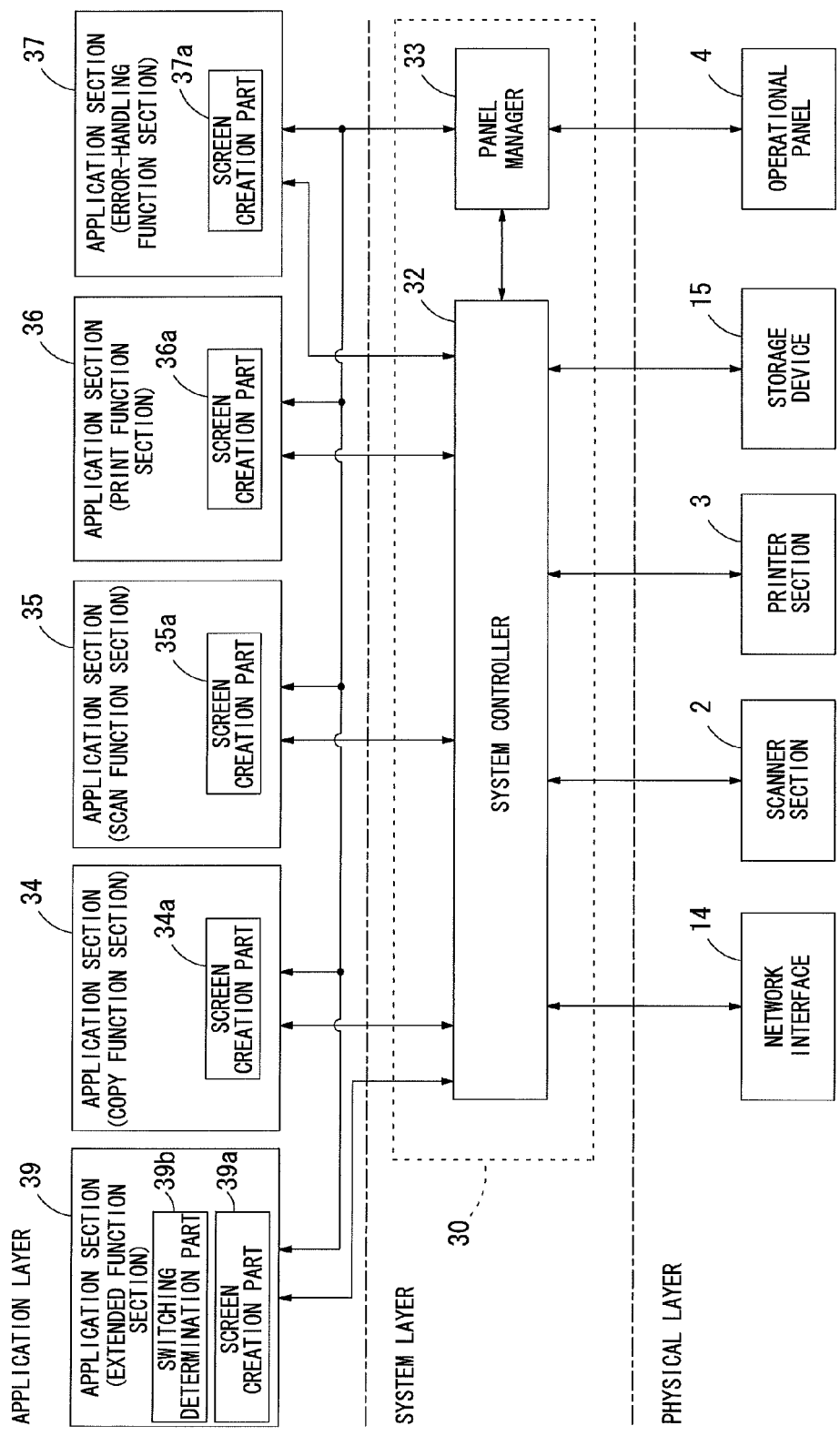
FIG. 8 shows a system configuration of the first preferred embodiment after all programs are started in a state where the extended function is added to the image formation device.

FIG. 8 shows a system configuration after all the programs are started in a state where the extended function is added to the image formation device 1. As each program is started in the image formation device 1, a system with three layers including a physical layer, a system layer and an application layer is configured as shown in FIG. 8. Here, an application section 39 responsible for the extended function realized by the extending application program 29 is placed in the application layer higher than the system layer. The application section 39 executes a function such as the "Scan To" function or the character recognition function described above that is not categorized as a standard function. The application section 39 includes a screen creation part 39a for creating a display screen relating to the extended function, and a switching determination part 39b for determining whether or not a display screen to be displayed on the display unit 5 of the operational panel 4 should be switched in response to an event occurring in the image formation device 1.

The application section 39 controls each hardware section in the physical layer through the operating system 30, thereby executing a processing based on the extended function. As an example, when the extended function is the "Scan To" function, the application section 39 controls the scanner section 2 through the system controller 32, thereby reading a document to acquire image data. Then, the application section 39 controls the network interface 14 through the system controller 32, thereby transmitting the acquired image data to at least one of the information processing devices 9a, 9b and 9c. When the extended function is the character recognition function, the application section 39 controls the scanner section 2 through the system controller 32, thereby obtaining image data targeted for character recognition to execute character recognition on the acquired image data. Then, the application section 39 saves data in text format generated as a result of the character recognition into at least one of the storage regions 16 through the system controller 32. The screen creation part 39a creates a display screen relating to the extended function, and outputs the same to the panel manager 33.

Figure 9:
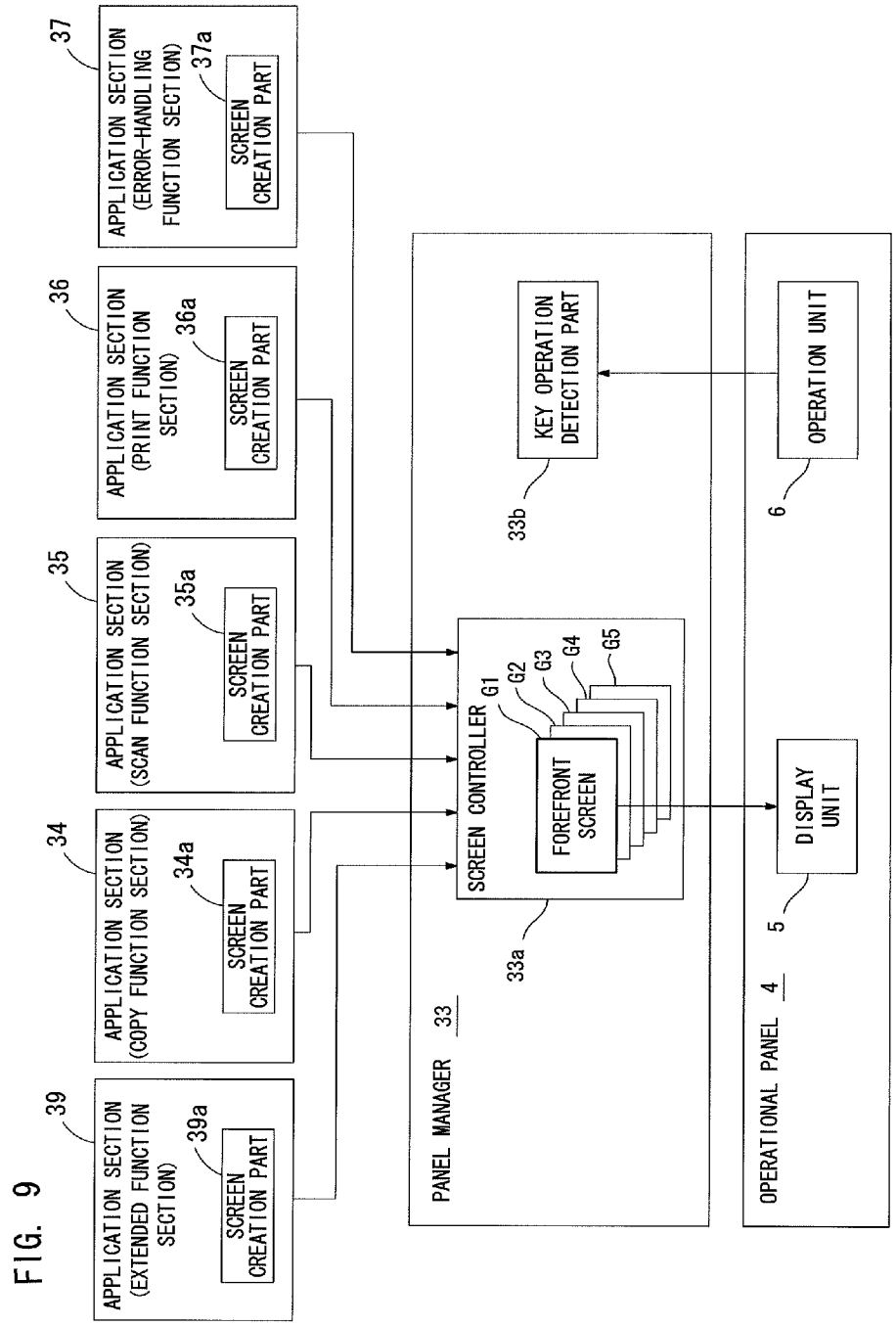
FIG. 9 is a block diagram showing an exemplary idea of the specific configuration of the panel manager with the extending application program running.

FIG. 9 is a block diagram showing an exemplary idea of the specific configuration of the panel manager 33 with the extending application program 29 running. In this case, the panel manager 33 has the same configuration as that shown in FIG. 5, and includes the screen controller 33a and the key operation detection part 33b.

As shown in FIG. 9, when the extended function is implemented in the image formation device 1, the screen controller 33a inputs display screens relating to each function respectively created in the screen creation parts 34a, 35a, 36a, 37a and 39a in the plurality of application sections 34, 35, 36, 37 and 39 running on the operating system 30. Then, the screen controller 33a selectively switches a display screen to be displayed on the display unit 5 of the operational panel 4. As an example, as shown in FIG. 9, the screen controller 33a manages display screens G1, G2, G3, G4 and G5 input from the plurality of application sections 34, 35, 36, 37 and 39 respectively in a layered structure in which the display screens G1, G2, G3, G4 and G5 are superimposed on each other. The screen controller 33a outputs the display screen G1 at the forefront in the layered structure as an active display screen to the display unit 5, and manages the display screens G2, G3, G4 and G5 which are not positioned at the forefront as background display screens. So, when the extended function is added, the number of display screens managed by the screen controller 33a increases accordingly.

While the application sections 34, 35, 36 and 39 are executing their respective jobs, display screens responsive to the progresses of the corresponding jobs are created by the screen creation parts 34a, 35a, 36a and 39a. One of the display screens that is made active by the control of the screen controller 33a is displayed on the display unit 5 of the operational panel 4, thereby displaying the progress of the corresponding job. When using the extended function, a user normally operates the operation unit 6 of the operational panel 4 to switch a display screen to be displayed on the display unit 5 to a display screen relating to the extended function. So, a display screen indicating the progress of a job based on the extended function is displayed on the display unit 5 during execution of the job of the extended function.

When receiving a notification indicating generation of an error from the system controller 32, the panel manager 33 requests the application section 37 as the error-handling function section to create a display screen responsive to the details of the error. At this time, when a display screen relating to the extended function created in the screen creation part 39a of the application section 39 is displayed as an active screen on the display unit 5, the panel manager 33 makes an inquiry at the application section 39 whether or not a display screen to be displayed on the display unit 5 should be switched to a display screen for error notification created in the screen creation part 37a of the application section 37. In order to do so, the panel manager 33 makes a request for a determination as to screen switching to the application section 39. This switching determination request contains information about the error generated in the image formation device 1.

As inputting the switching determination request from the panel manager 33, the application section 39 for the extended function puts the switching determination part 39b (see FIG. 8) into operation. Then, the switching determination part 39b determines whether or not a display screen to be displayed on the display unit 5 should be switched to an error screen, and transmits a result of the determination to the panel manager 33. As an exemplary way for the determination, the switching determination part 39b analyzes the error information. Then, when the error generated in the image formation device 1 affects the execution of the job of the extended function, so which means if it is impossible to continue the execution of the job of the extended function, the switching determination part 39b instructs the panel manager 33 to switch a display screen to be displayed on the display unit 5 to the error screen. In contrast, when the error generated in the image formation device 1 does not affect the execution of the job of the extended function, so which means if the execution of the job of the extended function can be continued, the switching determination part 39b instructs the panel manager 33 to prohibit switching of a display screen to be displayed on the display unit 5. There might be some cases in which the determination of whether or not the generated error affects the execution of the job of the extended function as a result of the analysis of the error information by the switching determination part 39b cannot be made. In such cases, the switching determination part 39b does not respond to the switching determination request.

When the panel manager 33 receives instructions for screen switching from the application section 39 after transmitting the switching determination request to the application section 39 for the extended function, the panel manager 33 switches a display screen to be displayed on the display unit 5 of the operational panel 4 from the display screen relating to the extended function to the error screen. In other cases, the panel manager 33 does not make switching, so that the display screen relating to the extended function continues to be displayed on the display unit 5.

Figure 10:
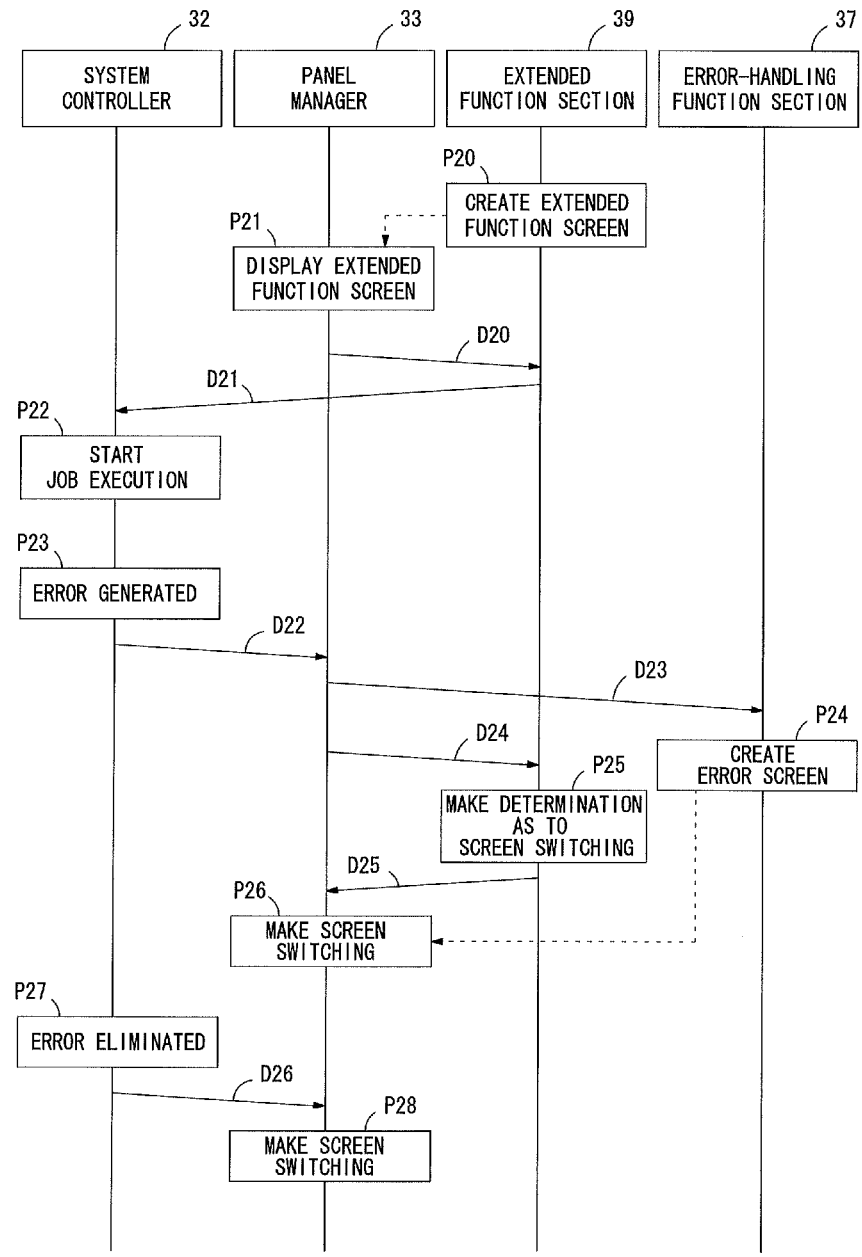
FIG. 10 explains an example of a process executed in each section when an error is generated during execution of a job of the extended function.

FIG. 10 explains an example of a process executed in each section when an error is generated during execution of a job of the extended function, especially the process executed when the panel manager 33 makes switching to an error screen based on instructions for screen switching. As explained in FIG. 10, an extended function screen is created in the extended function section as the application section 39 (process P20). After a user operates the operational panel 4 to select the extended function, the panel manager 33 displays the extended function screen created in the extended function section 39 on the display unit 5 of the operational panel 4 (process P21). The user operates the operational panel 4 to give instructions to start execution of a job of the extended function. In response, the panel manager 33 outputs key information D20 of an operation key operated by the user to the extended function section 39. After inputting the key information D20, the extended function section 39 determines that the input key information D20 is instructions to start the execution of the job. Then, the extended function section 39 outputs information D21 containing setting information, a procedure and the like of the job to the system controller 32. In response, the system controller 32 drives and controls a hardware section in the physical layer to start execution of the job based on the designated procedure (process P22).

When detecting an error caused for example by a document jam generated in the scanner section 2 (process P23) after the execution of the job of the extended function is started, the system controller 32 stops the operation of the scanner section 2, and outputs a notification D22 for notifying the error generation to the panel manager 33. As inputting the error generation notification D22, the panel manager 33 outputs a request D23 for an error screen responsive to the generated error to the error-handling function section as the application section 37. In response, the error-handling function section 37 creates an error screen responsive to the generated error (process P24). Thus, the panel manager 33 can hold the error screen responsive to the generated error as a background display screen.

After transmitting the error screen request D23 to the error-handling function section 37, the panel manager 33 outputs a request D24 for a determination as to screen switching to the extended function section 39 in order to make an inquiry at the extended function section 39 whether or not a display screen to be displayed on the display unit 5 of the operational panel 4 should be switched to the error screen. As inputting the switching determination request D24, the extended function section 39 determines whether the document jam generated in the scanner section 2 affects the execution of the job of the extended function (process P25). When determining that the error affects the execution of the job of the extended function, the extended function section 39 outputs instructions D25 for screen switching to the panel manager 33. When, for example, the extended function is the "Scan To" function or the character recognition function, image data which to be scanned to or image data targeted for a character recognition processing cannot be acquire if the document jam is generated in the scanner section 2 during the execution of the job. This makes it impossible to continue the execution of the job, so the switching determination part 39b outputs the screen switching instructions D25.

As inputting the screen switching instructions D25, the panel manager 33 switches a display screen to be displayed on the display unit 5 of the operational panel 4 from the extended function screen created in the extended function section 39 to the error screen created in the error-handling function section 37 (process P26). Thus, the user can notice the error generation, and can take actions to eliminate the error based on guidance displayed on the display screen.

When determining that the error has been eliminated (process P27), the system controller 32 restarts the operation of the scanner section 2, and outputs a notification D26 of error elimination to the panel manager 33. As inputting the error elimination notification D26, the panel manager 33 switches a display screen to be displayed on the display unit 5 of the operational panel 4 from the error screen created in the error-handling function section 37 to the extended function screen created in the extended function section 39 (process P28). As a result, a display screen on the operational panel 4 is back to a screen indicating the progress of the job of the extended function, so that the user can see the progress of the restarted job.

Figure 11:
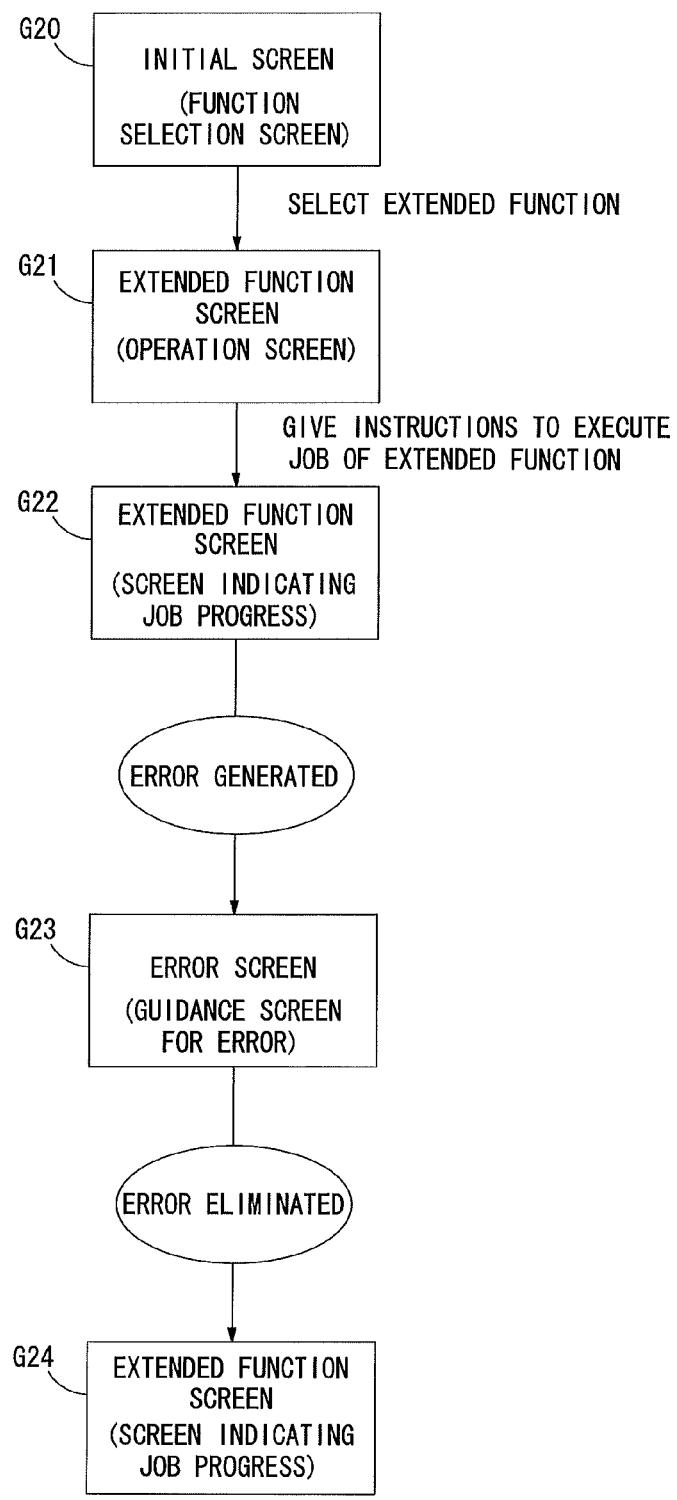
FIG. 11 is an example explaining how a screen displayed on the display unit of the operational panel changes in response to the processes explained in FIG. 10.

FIG. 11 is an example explaining how a screen displayed on the display unit 5 of the operational panel 4 changes in response to the processes explained in FIG. 10. First, an initial screen G20 is displayed on the display unit 5 of the operational panel 4. When, for example, the user makes an operation to select the extended function with the initial screen G20 being displayed, a display screen to be displayed on the display unit 5 changes from the initial screen G20 to an extended function screen G21 relating to the extended function under switching control by the panel manager 33. The extended function screen G21 is an operation screen for the user to make a setting operation relating to the extended function, for example. After the user completes the setting operation or the like and gives instructions to execute the job of the extended function, the extended function screen G21 displayed on the display unit 5 is changed to an extended function screen G22 indicating the progress of the job. This screen change is realized by the screen creation part 39a of the application section 39. So, the panel manager 33 does not execute screen switching at this time.

When the system controller 32 detects generation of an error such as a document jam in the scanner section 2 during execution of the job of the extended function, it becomes impossible to continue the execution of the job of the extended function. Thus, based on a determination made by the switching determination part 39*b* of the extended function section 39, the panel manager 33 switches a display screen to be displayed on the display unit 5 from the extended function screen G22 to an error screen G23. The error screen G23 is a guidance screen for providing a way to handle the error generated in the image formation device 1. After the user takes appropriate actions to eliminate the error, the execution of the job of the extended function is restarted. Then, the panel manager 33 switches a display screen to be displayed on the display unit 5 from the error screen G23 to an extended function screen G24. The extended function screen G24 which is a display screen relating to the extended function is the same as the extended function screen G22 displayed before generation of the error.

Figure 12:
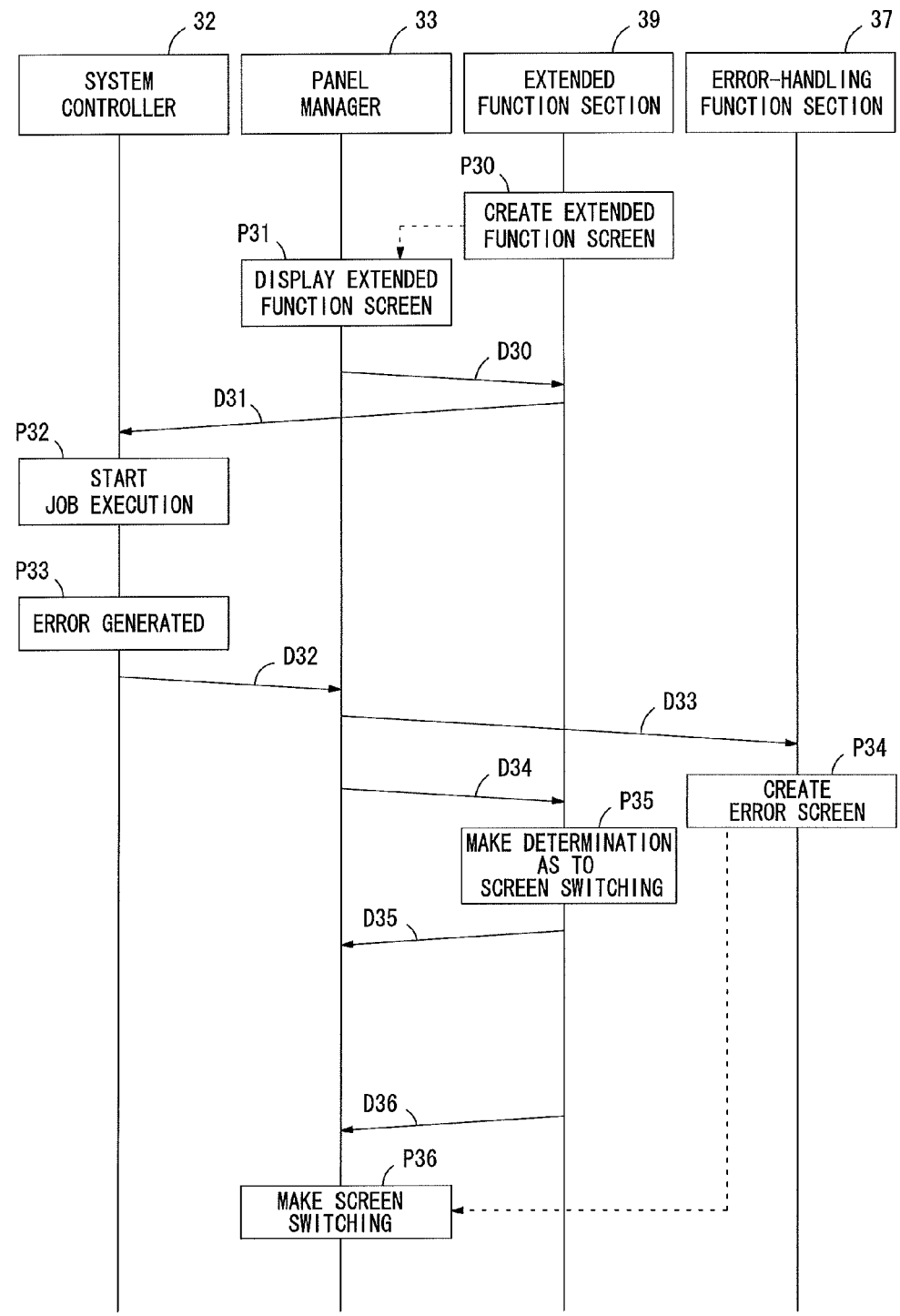
FIG. 12 explains another example of a process executed in each section when an error is generated during execution of a job of the extended function.

FIG. 12 explains another example of a process executed in each section when an error is generated during execution of a job of the extended function, especially the process executed when the panel manager 33 does not make switching to an error screen in response to the generated error. Processes P30, P31 and P32 illustrated in FIG. 12 executed before error generation are respectively the same as processes P20, P21 and P22 illustrated in FIG. 10 executed before error generation.

When detecting an error, for example, caused by a sheet jam generated in the printer section 3 (process P33) after execution of a job of the extended function is started, the system controller 32 stops the operation of the printer section 3, and outputs a notification D32 for notifying the error generation to the panel manager 33. As inputting the error generation notification D32, the panel manager 33 outputs a request D33 for an error screen responsive to the generated error to the error-handling function section as the application section 37. In response, the error-handling function section 37 creates an error screen responsive to the generated error (process P34).

After transmitting the error screen request D33 to the error-handling function section 37, the panel manager 33 outputs a request D34 for a determination as to screen switching to the extended function section 39 in order to makes an inquiry at the extended function section 39 whether or not a display screen to be displayed on the display unit 5 of the operational panel 4 should be switched to the error screen. As inputting the switching determination request D34, the extended function section 39 determines whether the sheet jam generated in the printer section 3 affects the execution of the job of the extended function (process P35). When determining that the error does not affect the execution of the job of the extended function, the extended function section 39 outputs instructions D35 to prohibit screen switching to the panel manager 33. For instance, it is assumed that the extended function is the "Scan To" function or the character recognition function, and the sheet jam is generated in the printer section 3 during the execution of the job. Even in such a case, the generated error does not affect the execution of the job of the extended function at all. So, the switching determination part 39*b* outputs the screen switching prohibiting instructions D35.

When inputting the screen switching prohibiting instructions D35, the panel manager 33 does not make switching of a display screen to be displayed on the display unit 5 of the operational panel 4, and puts an extended function screen to remain displayed. In this case, the execution of the job of the extended function is continued even if the operation of the printer section 3 is stopped, so a screen indicating the progress of the job of the extended function continues to be displayed on the display unit 5 of the operational panel 4. After the processing executed by the extended function section 39 is completed, and a user makes an operation to terminate use of the extended function the extended function section 39 outputs a notification D36 of termination of use of the extended function to the panel manager 33. On receipt of the use termination notification D36, the panel manager 33 switches a display screen to be displayed on the display unit 5 from the extended function screen created in the extended function section 39 to the error screen created in the error-handling function section 37 (process P36). By way of example, the panel manager 33 manages the error screen created in the error-handling function section 37 as a screen in a second layer. In response to the user's operation to terminate use of the extended function, the panel manager 33 sets the extended function screen positioned at the forefront as a rearmost screen. Thus, the error screen in the second layer is automatically being a screen at the forefront, so that the error screen is displayed as an active screen on the display unit 5. As a result, the user is able to notice that the error has been generated in the printer section 3 after terminating use of the extended function, and to take actions to eliminate the error based on guidance displayed on the display screen.

Figure 13:
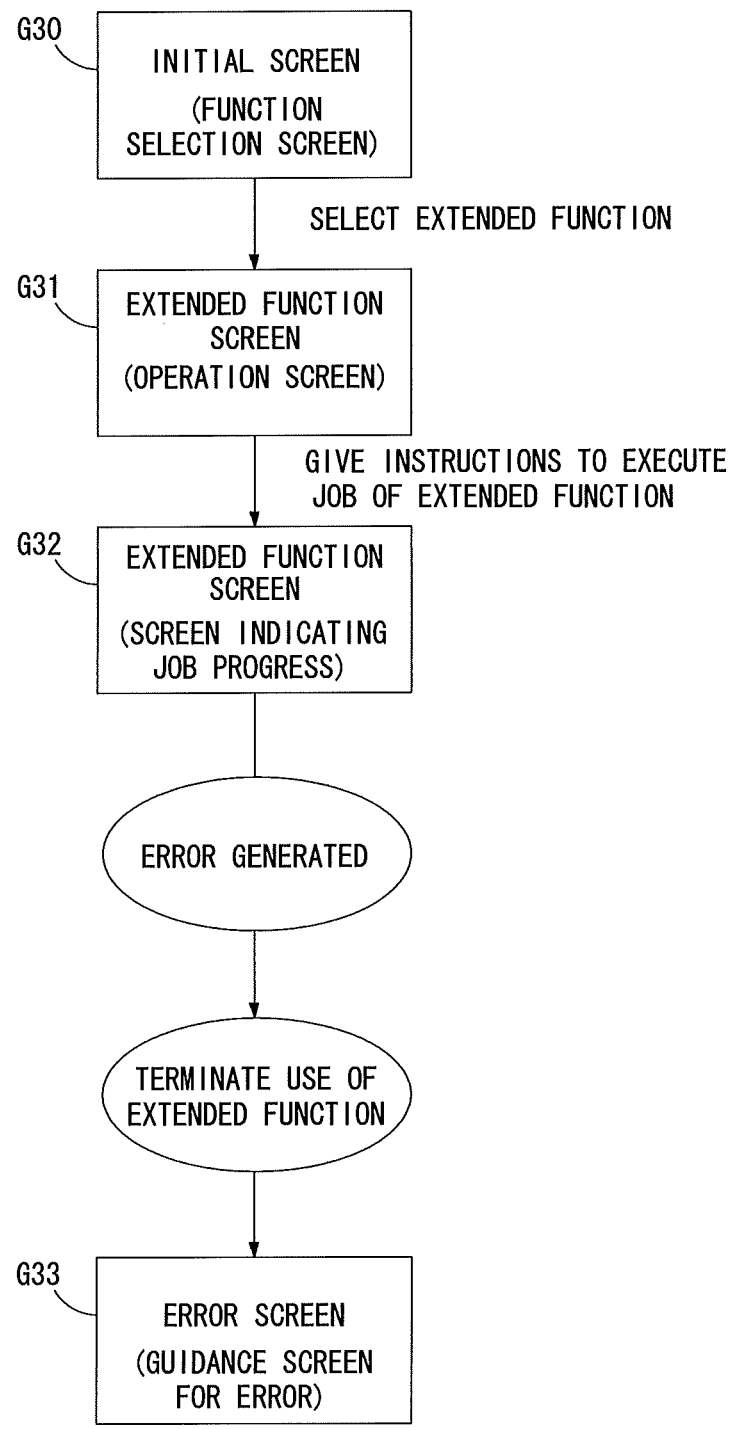
FIG. 13 is an example explaining how a screen displayed on the display unit of the operational panel changes in response to the processes explained in FIG. 12.

FIG. 13 is an example explaining how a screen displayed on the display unit 5 of the operational panel 4 changes in response to the processes explained in FIG. 12. First, an initial screen G30 is displayed on the display unit 5 of the operational panel 4. When, for example, the user makes an operation to select the extended function with the initial screen G30 being displayed, a display screen to be displayed on the display unit 5 changes from the initial screen G30 to an extended function screen G31 relating to the extended function under switching control by the panel manager 33. The extended function screen G31 is, for example, an operation screen for the user to make a setting operation relating to the extended function. After the user completes the setting operation or the like and gives instructions to execute the job of the extended function, the extended function screen G31 displayed on the display unit 5 is changed to an extended function screen G32 indicating the progress of the job. This screen change is realized by the screen creation part 39*a* of the application section 39. So, the panel manager 33 does not execute screen switching at this time.

The execution of the job of the extended function can be continued even when the system controller 32 detects generation of an error such as a sheet jam in the printer section 3 during the execution of the job of the extended function. Thus, based on a determination made by the switching determination part 39*b* of the application section 39, the panel manager 33 continues to display the extended function screen G32 without making switching of a display screen to be displayed on the display unit 5. After the user terminates use of the extended function, the panel manager 33 makes switching of a display screen, so that an error screen G33 is displayed on the display unit 5.

In the example explained in FIG. 12, the application section 39 for the extended function analyzes the details of the error, determines that the error does not affect the execution of the job of the extended function, and thereafter outputs the screen switching prohibiting instructions D35 to the panel manager 33. However, there might be some other cases, that determination of whether or not an error affects the execution of the job of the extended function cannot be made, for example, a case that the application section 39 for the extended function cannot figure the details of the error out. In this a case, the application section 39 for the extended function does not respond to the screen switching determination request D34, so that the panel manager 33 does not receive the screen switching instructions D25 as explained in FIG. 10. Thus, switching of a screen on the display unit 5 is not executed even in such a case.

As described above, when the system controller 32 detects the occurrence of an event (such as error generation) in a hardware section with the extended function implemented in the image formation device 1 and with a display screen created in the application section 39 for the extended function being displayed on the display unit 5, the panel manager 33 requests the application section 39 for the extended function to determine whether or not switching of a display screen to be displayed on the display unit 5 should be made. Then, based on a result of the determination made by the application section 39, the panel manager 33 controls switching of a display screen to be displayed on the display unit 5. In more detail, when the application section 39 for the extended function instructs the panel manager 33 to prohibit switching of a display screen, or when the application section 39 does not give any instructions to the panel manager 33, the panel manager 33 does not execute screen switching in response to the occurrence of the event. As a result, the display screen relating to the extended function continues to be displayed on the display unit 5. In contrast, when the application section 39 for the extended function instructs the panel manager 33 to execute switching of a display screen, the panel manager 33 executes screen switching in response to the occurrence of the event. As a result, a display screen responsive to the event is displayed on the display unit 5.

So, in the image formation device 1 of the first preferred embodiment, where a display screen relating to an extended function is displayed on the operational panel 4, the operating system 30 is not responsible for making a determination as to switching of a display screen to be displayed on the operational panel 4 by itself but making the application section 39 for the extended function to make the determination. Then, the operating system 30 executes switching control based on a result of the determination. Thus, the image formation device 1 of the first preferred embodiment suppresses the increase of a burden on the operating system 30, while preventing a display screen to be displayed on the operational panel 4 from being switched to an error screen undesirably and forcibly.

Described next are a procedure followed by the panel manager 33 when a notification of error generation is received, and a procedure followed by the application section (extended function section) 39 for the extended function when a request for a determination as to screen switching is received based on the assumption that an event occurring in the image formation device 1 is an error.

Figure 14:
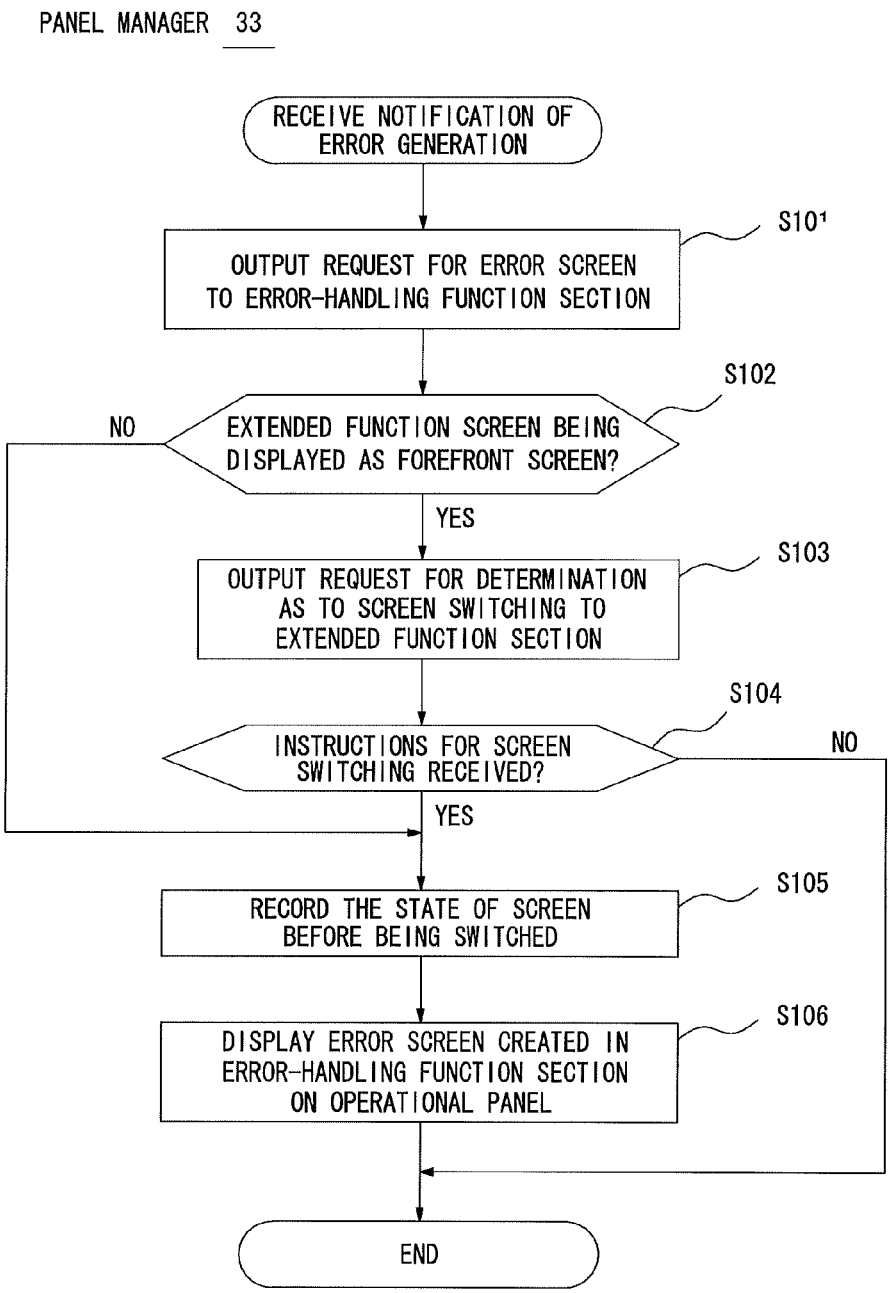
FIG. 14 is a flow diagram explaining an exemplary procedure of a processing executed by the panel manager when a notification of error generation is received.

FIG. 14 is a flow diagram showing an exemplary procedure of a processing executed by the panel manager 33 when a notification of error generation is received. This processing is executed mainly by the screen controller 33a of the panel manager 33. When receiving the error generation notification from the system controller 32, the panel manager 33 outputs a request for an error screen to the error error-handling function section 37 (step S101). In response, the error-handling function section 37 creates an error screen responsive to a generated error. Then, the panel manager 33 determines whether or not an extended function screen is being displayed on the display unit 5 (step S102). The determination is made based on whether or not a display screen created in the extended function section 39, which is one of the several display screens G1 to G5 (see FIG. 9) managed by the panel manager 33, is positioned at the forefront.

When the extended function screen is displayed on the display unit 5 (when a result of step S102 is YES), the panel manager 33 outputs a request for a determination as to screen switching to the extended function section 39 (step S103). In response, the extended function section 39 determines whether or not screen switching should be executed. The panel manager 33 thereafter determines whether or not instructions for screen switching have been received during a predetermined period of time after outputting the screen switching determination request from the extended function section 39 (step S104). When the screen switching instructions were received (when a result of step S104 is YES), the panel manager 33 moves on to step S105 to execute switching of a display screen. In contrast, when the screen switching instructions were not received, the panel manager 33 completes the processing without executing switching of a screen on the display unit 5.

When the extended function screen is not displayed on the display unit 5 (when a result of step S102) is NO, the panel manager 33 moves on to step S105 to execute switching of a display screen.

In step S105, the panel manager 33 records the state of a display screen on the display unit 5 displayed before being switched. The recording of the screen state allows a display screen to return to its former state at the time of error elimination. Next, the panel manager 33 shifts the error screen to the forefront that was created in the error-handling function section 37 in response to the error screen request given in step S101, thereby switching a display screen to be output on the display unit 5 to the error screen (step S106). As a result, a display screen to be displayed on the display unit 5 is switched to the error screen. The processing executed by the panel manager 33 when the error generation notification is received is thereby completed.

Figure 15:
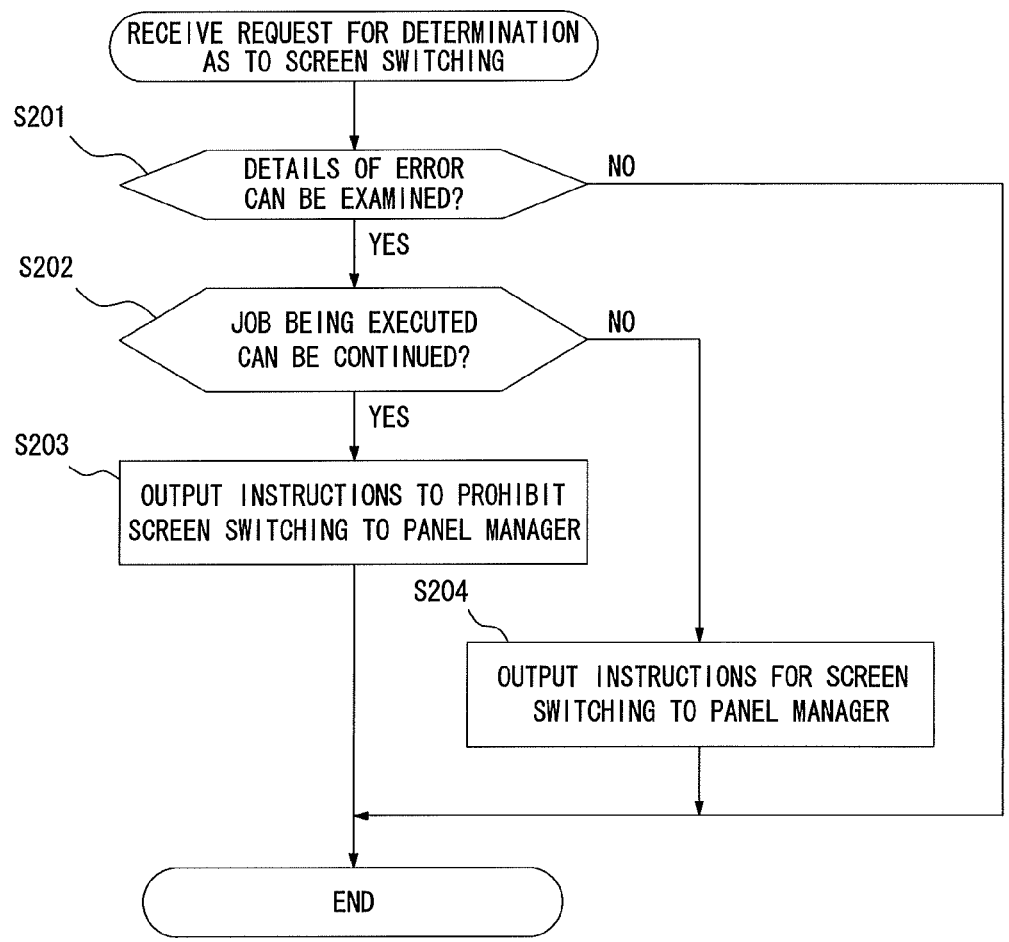
FIG. 15 is a flow diagram explaining an exemplary procedure of a processing executed by an extended function section when a request for a determination as to screen switching is received from the panel manager.

FIG. 15 is a flow diagram explaining an exemplary procedure of a processing executed by the extended function section 39 when a request for a determination as to screen switching is received from the panel manager 33. This processing is executed mainly by the switching determination part 39b (see FIG. 8) of the extended function section 39. When receiving the screen switching determination request, the extended function section 39 analyzes the information of an error to determine whether or not the details of the generated error can be examined (step S201). When the details of the error cannot be examined (when a result of step S201 is NO), the extended function section 39 completes the processing without executing any subsequent steps. In contrast, when the details of the error can be examined (when a result of step S201 is YES), the extended function section 39 determines whether or not a job that is being executed can be continued in a situation where the error has been generated (step S202). When the job that is being executed can be continued (when a result of step S202 is YES), the extended function section 39 outputs instructions to prohibit screen switching to the panel manager 33 (step S203), and then completes the processing. When the job that is being executed cannot be continued (when a result of step S202 is NO), the extended function section 39 outputs instructions for screen switching to the panel manager 33 (step S204), and then completes the processing.

Due to the processing described above, the panel manager 33 constituting a part of the operating system 30 is able to make the extended function section 39 determining whether or not switching of a display screen should be executed at the time of error generation. Besides, the panel manager 33 is not required to precisely figure out the substance of processing by the extended function section 39, so a processing burden on the panel manager 33 during switching of a display screen is reduced. Further, the extended function section 39 outputs instructions for screen switching only when an error makes it impossible to continue the execution of a job. So, the panel manager 33 does not execute unnecessary screen switching during the execution of a job of the extended function, by which the operability of the extended function can be improved.

Figure 16:
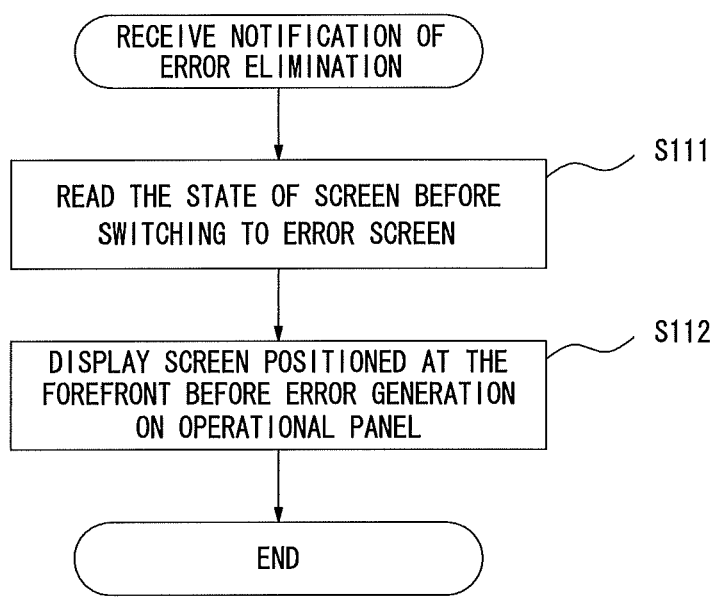
FIG. 16 is a flow diagram explaining an exemplary procedure of a processing for screen switching executed by the panel manager when a notification of error elimination shown in FIG. 10 is received.

FIG. 16 is a flow diagram explaining an exemplary procedure of a processing for screen switching executed by the panel manager 33 when the error elimination notification D26 shown in FIG. 10 is received. This processing is also executed mainly by the screen controller 33a of the panel manager 33. When receiving the error elimination notification from the system controller 32, the panel manager 33 reads the state of a screen that was recorded before switching to an error screen (step S111). Here, the screen state recorded in step S105 in the flow diagram of FIG. 14 is read. Then, based on the screen state thereby read, the panel manager 33 returns the layered structure of several display screens created in the corresponding application sections to the previous state of the error generation. Next, the panel manager 33 outputs a display screen that had been positioned at the forefront before the error generation to the display unit 5, so that this display screen is displayed on the operational panel 4 (step S112). The processing executed by the panel manager 33 at the time of error elimination causes the display unit 5 of the operational panel 4 to automatically return to the previous state of the error generation.

So, where an event such as error generation is occurred, the image formation device 1 of the first preferred embodiment can appropriately control switching of a display screen without placing a heavy burden on the operating system 30. Even when an error or the like is generated with a display screen relating to the extended function being displayed on the display unit 5 and with a job of another function being executed as a background job, the operating system 30 is free from a heavy burden. So, that switching of a display screen can appropriately be controlled. Thus, the image formation device 1 of the first preferred embodiment is user friendly, and has excellent operability.

Second Preferred Embodiment

A second preferred embodiment of the present invention is described next. In the above-described first preferred embodiment, when receiving a notification of error generation while displaying an extended function screen on the display unit 5 of the operational panel 4, the page manager 33 always outputs a request for a determination as to screen switching to the extended function section 39 to make the extended function section 39 determining whether or not a display screen should be switched. An error detected by the system controller 32 includes various types of errors. When, for example, the shutdown of a cooling fan not illustrated in figures or the physical damage of the storage device 15 is detected as an error a user should be prompted to take action urgently. So, in the second preferred embodiment, in response to an error detected by the system controller 32, the panel manager 33 determines whether or not the generated error is the one requires prompting a user to take action urgently, and then controls switching of a display screen. The image formation device 1 of the second preferred embodiment has the same overall configuration and the system configuration as those of the image formation device 1 of the first preferred embodiment.

Figure 17:
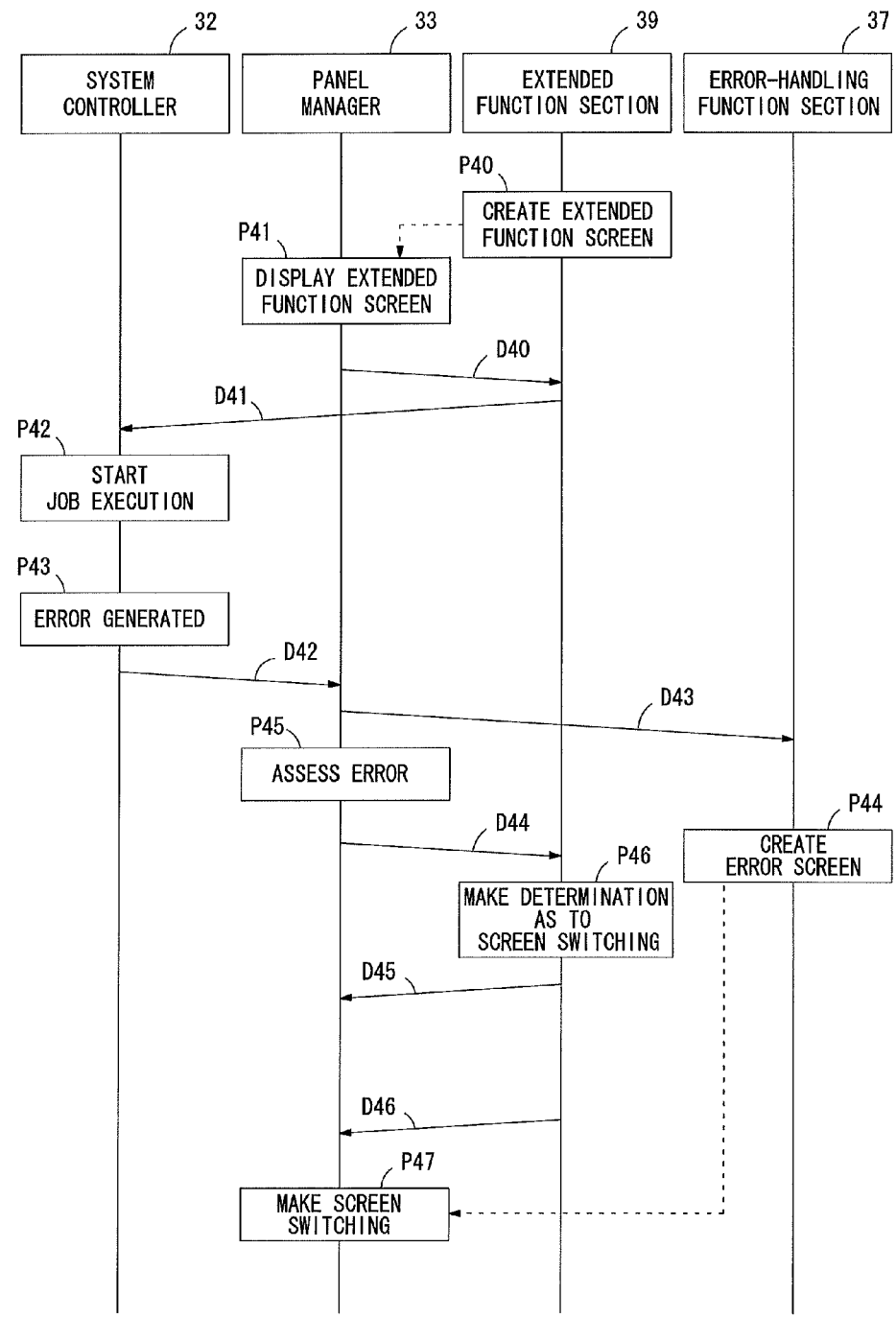
FIG. 17 explains an example of a processing executed in each section of a second preferred embodiment of the present invention when an error of less urgency is generated during execution of a job of an extended function.

FIG. 17 explains an example of a processing executed in each section of the image formation device 1 of the second preferred embodiment when an error of less urgency is generated during execution of a job of an extended function. Processes P40, P41 and P42 illustrated in FIG. 17 that are executed before error generation are respectively the same as processes P20, P21 and P22 illustrated in FIG. 10 executed before error generation.

When detecting generation of an error (process P43) after the execution of the job of the extended function is started, the system controller 32 outputs a notification D42 for notifying the error generation to the panel manager 33. As inputting the error generation notification D42, the panel manager 33 outputs a request D43 for an error screen responsive to the generated error to the error-handling function section as the application section 37. In response, the error-handling function section 37 creates an error screen responsive to the generated error (process P44).

After transmitting the error screen request D43 to the error-handling function section 37, the panel manager 33 conducts an error assessment (process P45). In this error assessment, the level of the error detected by the system controller 32 is determined. As an example, an error necessitating replacement of a hardware section such as that generated by the shutdown of a cooling fan not illustrated in figures or the physical damage of the storage device 15 is regarded as an error of more urgency, and is set to have an error level higher than a predetermined level. An error generated by a sheet jam in the scanner section 2 or in the printer section 3 is regarded as an error of less urgency, and is set to have an error level not higher than the predetermined level. Based on such error level settings, the panel manager 33 determines whether the error level set in advance for the error detected by the system controller 32 is equal to or lower than the predetermined level. Here, it is assumed that the detected error is determined to have an error level equal to or lower than the predetermined level, and thus is an error of less urgency. In this case, like in the first preferred embodiment, the panel manager 33 outputs a request D44 for a determination as to screen switching to the extended function section 39 in order to makes an inquiry at the extended function section 39 whether or not a display screen to be displayed on the display unit 5 of the operational panel 4 should be switched to an error screen as shown in FIG. 17.

Then, like in the first preferred embodiment, the panel manager 33 controls switching of a display screen in response to a reply from the extended function section 39. In the case of FIG. 17, the panel manager 33 receives instructions D45 to prohibit screen switching from the extended function section 39, so has not executed switching of a display screen in response to the error generation. When the processing by the extended function section 39 is completed, a user makes an operation to terminate use of the extended function. In response, the extended function section 39 transmits a notification D46 of termination of use of the extended function to the panel manager 33. As inputting the use termination notification D46, the panel manager 33 switches a display screen to be displayed on the display unit 5 from the extended function screen created in the extended function section 39 to the error screen created in the error-handling function section 37 (process P47).

Figure 18:
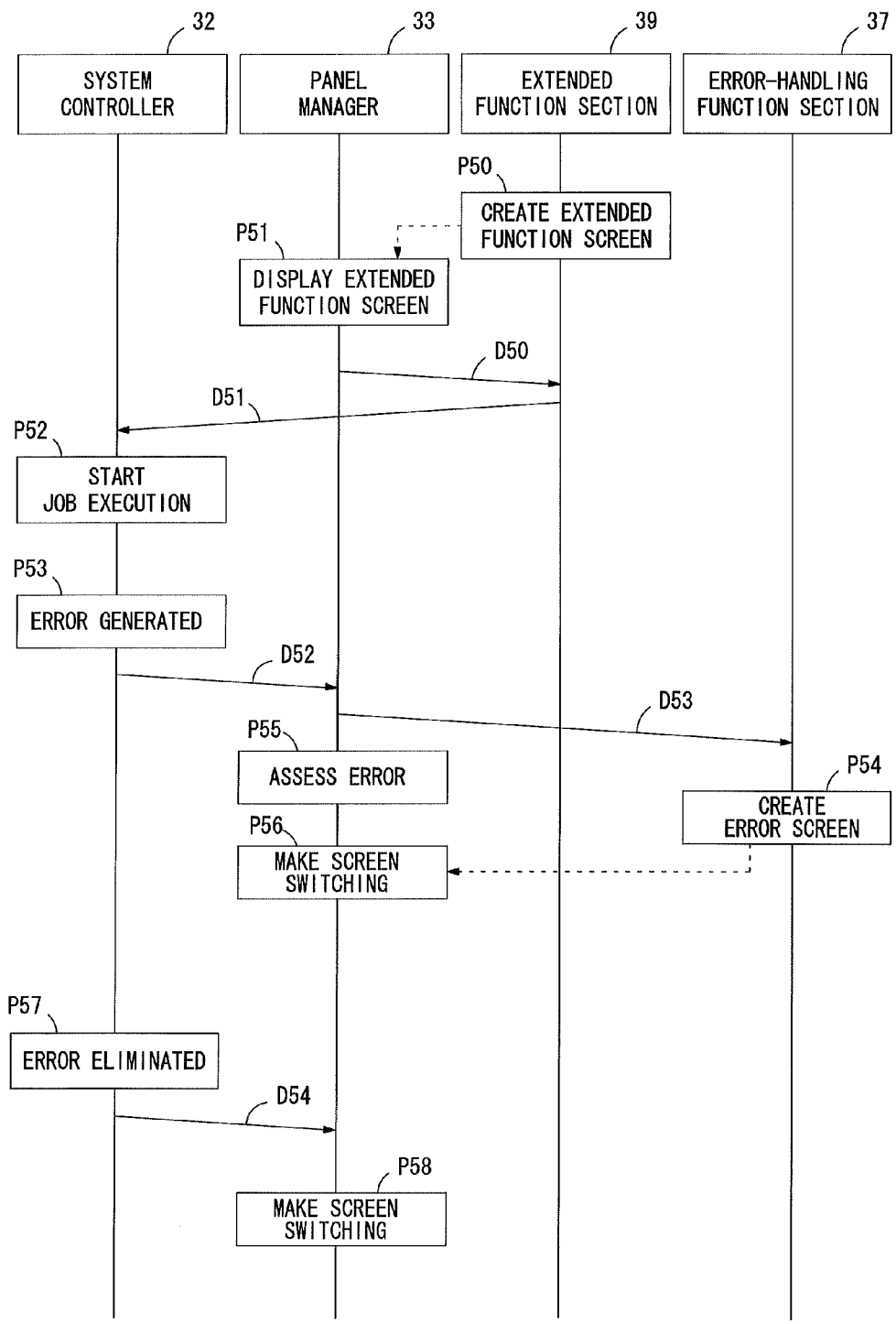
FIG. 18 explains an example of a processing executed in each section of the second preferred embodiment when an error of more urgency is generated during execution of a job of an extended function.

FIG. 18 explains an example of a processing executed in each section of the image formation device 1 of the second preferred embodiment when an error of more urgency is generated during execution of a job of the extended function. Processes P50, P51, P52 P53 and P54 illustrated in FIG. 18 that are executed before error assessment are respectively the same as processes P40, P41, P42, P43 and P44 illustrated in FIG. 17 that are executed before error assessment.

After transmitting a request D53 for an error screen to the error-handling function section 37, the panel manager 33 conducts an error assessment (process P55). In this error assessment, according to the error level determination as well as that described above, an error is found to be an error of more urgency having a level higher than the predetermined level. So, the panel manager 33 switches a display screen to be displayed on the display unit 5 from the extended function screen created in the extended function section 39 to the error screen created in the error-handling function section 37 (process P56) without making an inquiry at the extended function section 39. As a result, a user can immediately take action against the error without continuing execution of the extended function. After the error is eliminated (process P57), the panel manager 33 inputs a notification D54 of error elimination from the system controller 32. Then, the panel manager 33 switches a display screen to be displayed on the display unit 5 from the error screen to the extended function screen created in the extended function section 39 (process P58).

Figure 19:
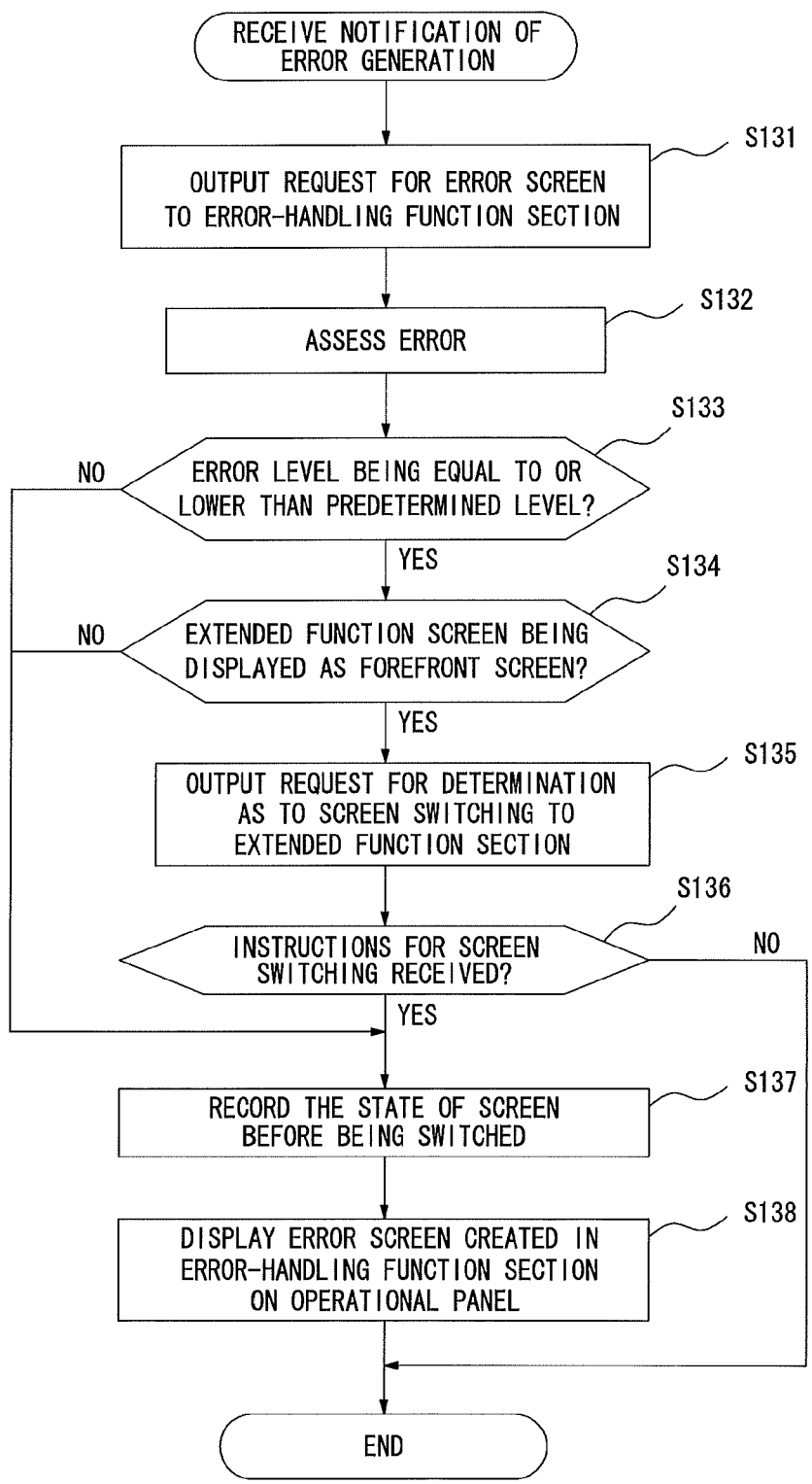
FIG. 19 is a flow diagram explaining an exemplary procedure of a processing executed by the panel manager in the second preferred embodiment when a notification of error generation is received.

FIG. 19 is a flow diagram explaining an exemplary procedure of a processing executed by the panel manager 33 when a notification of error generation is received. This processing is executed mainly by the screen controller 33a of the panel manager 33. When receiving the error generation notification from the system controller 32, the panel manager 33 outputs a request for an error screen to the error-handling function section 37 (step S131). In response, the error-handling function section 37 creates an error screen responsive to a generated error. Then, the panel manager 33 conducts an error assessment (step S132) to determine whether an error level is equal to or lower than the predetermined level (step S133). When the error level is equal to or lower than the predetermined level (when a result of step S133 is YES), the flow moves on to step S134 to determine whether or not an extended function screen is displayed on the display unit 5 (step S134). When the extended function screen is displayed (when a result of step S134 is YES), the panel manager 33 outputs a request for a determination as to screen switching to the extended function section 39 (step S135). When receiving instructions for screen switching from the extended function section 39 (when a result of step S136 is YES), the panel manager 33 records the current state of a screen (step S137), and thereafter switches a display screen to be displayed on the display unit 5 to the error screen created in the error-handling function section 37 (step S138). When not receiving the screen switching instructions from the extended function section 39 (when a result of step S136 is NO) after having transmitted the screen switching determination request, the panel manager 33 completes the processing without executing switching of a screen on the display unit 5.

When the error level is higher than the predetermined level (when a result of step S133 is NO) as a result of the error assessment made by the panel manager 33, or an extended function screen is not displayed on the display unit 5 (when a result of step S134 is NO), the flow moves on to step S137. In step S137, the panel manager 33 compulsorily switches a display screen to be displayed on the display unit 5 to the error screen.

By the procedure described above, when the system controller 32 detects generation of an error in a hardware section with a display screen created in the application section 39 for the extended function being displayed on the display unit 5, the panel manager 33 determines the level of the generated error. When the error level is higher than the predetermined level, the panel manager 33 switches a display screen to be displayed on the display unit 5 to an error screen. When the error level is equal to or lower than the predetermined level, the panel manager 33 requests the application section 39 for the extended function to make a determination as to screen switching.

So, in the image formation device 1 of the second preferred embodiment, in response to generation of an error, the operating system 30 determines whether or not the generated error is a serious error which requires urgent actions to be taken. When the error is found to be a serious error, a display screen to be displayed on the display unit 5 is switched to an error screen based on a determination made by the operating system 30. Thus, a user can immediately take appropriate action against the error while using an extended function. In other cases, the error is found not to be a serious error as a result of the error assessment made by the operating system 30. In this case, as well as the first preferred embodiment, the second preferred embodiment appropriately controls switching of a display screen without placing a heavy burden on the operating system 30.

Third Preferred Embodiment

A third preferred embodiment of the present invention is described next. In the above-described first and second preferred embodiments, when receiving a notification of error generation while displaying an extended function screen on the display unit 5 of the operational panel 4, the page manager 33 outputs a request for a determination as to screen switching to the extended function section 39 to make the extended function section 39 determine whether or not a display screen should be switched. Alternatively, when receiving a notification of error generation while displaying a display screen relating to a standard function on the display unit 5 of the operational panel 4, the panel manager 33 may also output a request for a determination as to screen switching to any one of the application sections 34, 35 and 36 for standard functions. Then, in response, the application section 34, 35 or 36 for the standard function may make a determination as to switching of a display screen. So, in the third preferred embodiment, not only the application section 39 for an extended function but also the application sections 34, 35 and 36 for the standard functions make a determination as to switching of a display screen. The image formation device 1 of the third preferred embodiment has the same overall configuration and the system configuration as the image formation devices 1 of the first and second preferred embodiments have.

Figure 20:
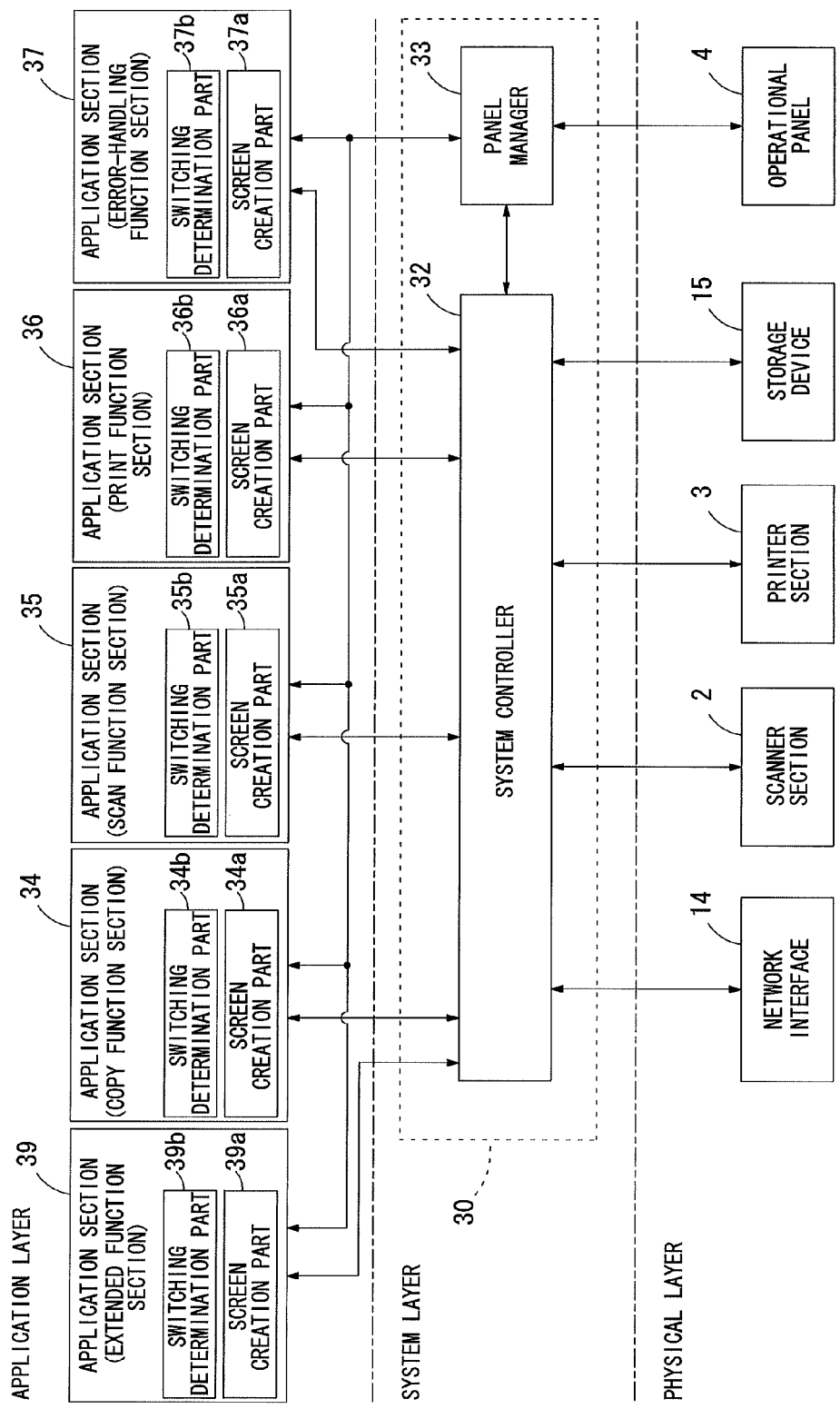
FIG. 20 is a block diagram showing a system configuration of a third preferred embodiment of the present invention in a state where all programs are started in the image formation device.

FIG. 20 is a block diagram showing a system configuration in a state where all programs are started in the image formation device 1. As in the first preferred embodiment, after each program is started in the image formation device 1, a system with three layers including a physical layer, a system layer and an application layer is configured as shown in FIG. 20. The application sections 34, 35, 36 and 37 for the standard functions respectively realized by the standard application programs 24 to 27, and the application section 39 for the extended function realized by the extending application program 29 are placed in the application layer.

In the third preferred embodiment, the application sections 34, 35, 36 and 37 and 39 respectively include the screen creation parts 34a, 35a, 36a, 37a and 39a for creating display screens relating to their respective functions, and switching determination parts 34b, 35b, 36b, 37b and 39b for determining whether or not a display screen to be displayed on the display unit 5 of the operational panel 4 should be switched in response to the occurrence of an event in the image formation device 1.

The panel manager 33 inputs several display screens created in the application sections 34, 35, 36, 37 and 39. Then, the panel manager 33 makes a display screen relating to a function selected by a user active, and displays the selected display screen on the display unit 5 of the operational panel 4.

Like in the first and second preferred embodiments, when receiving a notification of error generation from the system controller 32, the panel manager 33 requests the application section 37 as the error-handling function section to create a display screen responsive to the details of a generated error. Then, in the third preferred embodiment, when a display screen that is made active at the time of error generation relates not only to the extended function but also to a standard function, the panel manager 33 outputs a request for a determination as to screen switching to one of the application sections 34, 35, 36, 37 and 39 in which the display screen being active was created. The panel manager 33 thereby makes an inquiry about whether or not a display screen should be switched for error notification.

As receiving the screen switching determination request from the panel manager 33, each of the application sections 34, 35, 36, 37 and 39 puts its corresponding switching determination parts 34b, 35b, 36b, 37b and 39b into operation to determine whether or not a display screen displayed on the display unit 5 of the operational panel 4 should be switched. This determination is made in the same manner as that described in the first preferred embodiment. As an example, when the error generated in the image formation device 1 obstructs continuation of a job executed by each of the application sections 34, 35, 36, 37 and 39, the application section responsible for the function of which the job is being executed outputs instructions for screen switching to the panel manager 33. When the error does not obstruct continuation of the job, this application section outputs instructions to prohibit screen switching to the panel manager 33.

When inputting the screen switching instructions from the application section 34 to 37 or 39 to which the screen switching determination request was output, the panel manager 33 switches a display screen to be displayed on the display unit 5 to an error screen created in the application section 37 as the error-handling function section. When not inputting the screen switching instructions, the panel manager 33 does not switch a display screen to be displayed on the display unit 5.

As described above, in the third preferred embodiment, where an event such as generation of an error is occurred in the image formation device 1, the operating system 30 makes an inquiry at the application section 34, 35, 36, 37 or 39 for a function to which the display screen relating is being active at the time of the occurrence of the event asking whether or not a display screen should be switched, regardless of whether the display screen relates to the extended function or to a standard function. Then, the panel manager 33 controls switching of a screen in response to a reply to the inquiry. Thus, the panel manager 33 is not required to figure out the details of their respective processing of the application sections 34, 35, 36, 37 and 39 operating in the application layer at the time of the occurrence of the event, by which a processing burden on the operating system 30 is significantly reduced.

Like in the first and second preferred embodiments, in the third preferred embodiment, the screen controller 33a of the panel manager 33 (see FIG. 9) appropriately controls switching of a display screen to be displayed on the display unit 5 in response to whether or not the panel manager 33 received instructions for screen switching. So, the image formation device 1 of the third preferred embodiment is user friendly.

In the third preferred embodiment, the switching determination part 37b of the application section 37 as the error-handling function section may execute the error level determination at the time of error generation the same as that described in the second preferred embodiment. In this case, at the time of error generation, the operating system 30 is not necessary to determine whether or not a generated error is a serious error which requires urgent actions. So, a burden on the operating system 30 is reduced more significantly.

Fourth Preferred Embodiment

A fourth preferred embodiment of the present invention is described next. In the above-described first to third preferred embodiments, a display screen to be displayed on the operational panel 4 is created in each of the application sections 34, 35, 36 and 39. That is, in the above-described preferred embodiments, a display screen is created inside the image formation device 1. In contrast, in the fourth preferred embodiment, the image formation device 1 acquires a display screen to be displayed on the operational panel 4 from an external server such as a Web server through the Internet or the like. The image formation device 1 of the fourth preferred embodiment is the same in its hardware configuration and the like as the image formation device 1 of the first preferred embodiment. So, in the fourth preferred embodiment, only a feature difference from that of the first preferred embodiment is described.

Figure 21:
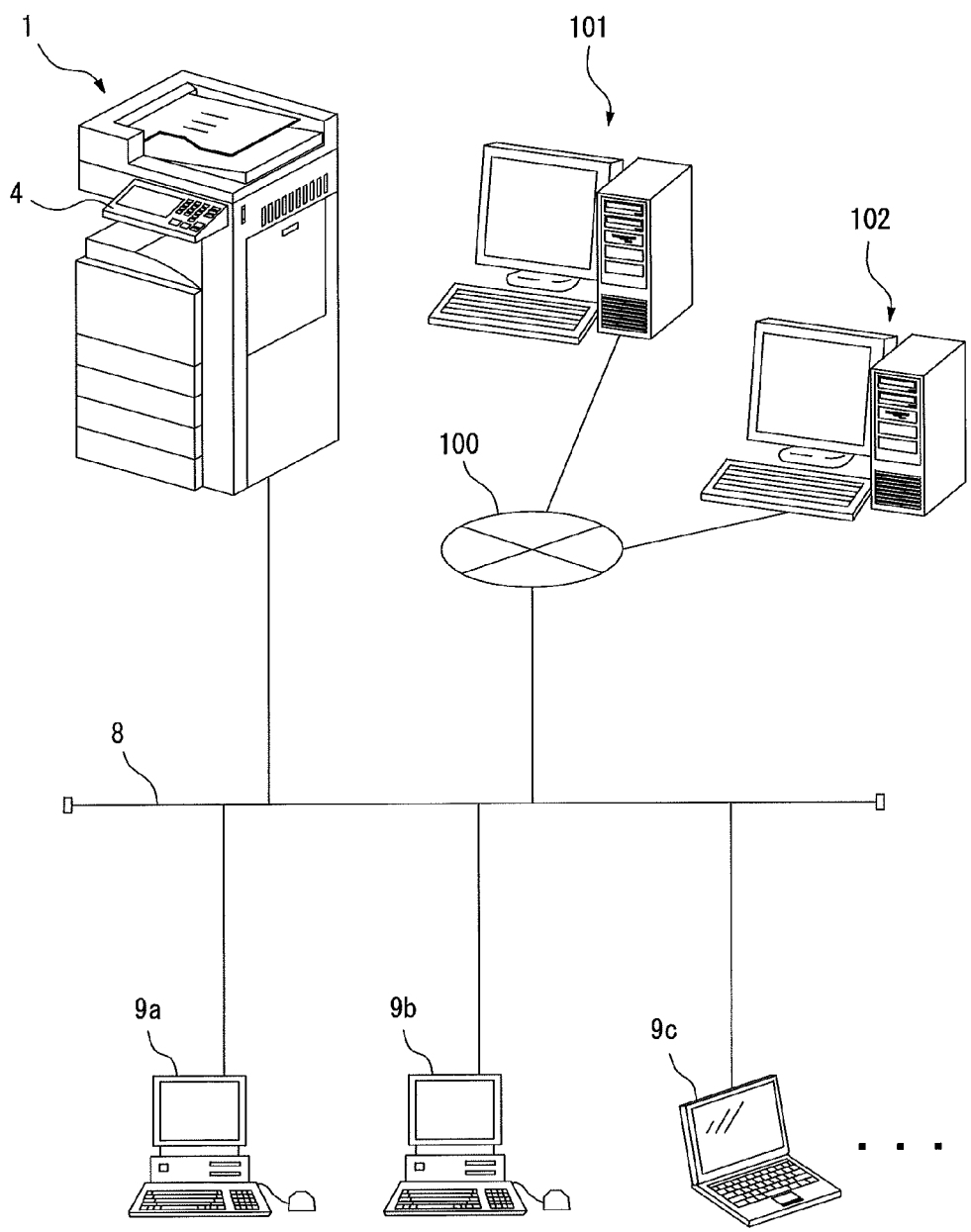
FIG. 21 shows the configuration of a network to which an image formation device of a fourth preferred embodiment of the present invention is connected.

FIG. 21 shows the configuration of a network to which the image formation device 1 according to the fourth preferred embodiment is connected. The image formation device 1 is connected to the Internet 100 through the network 8 such as a LAN, and can establish data communications with an external server 101 and an authentication server 102 that are Web servers connected to the Internet 100.

The external server 101 creates a display screen to be displayed on the operational panel 4 of the image formation device 1. The external server 101 creates a display screen for example of an excellent design such as a graphic-heavy design, compared to a display screen created in the image formation device 1. The external server 101 is registered in advance with the image formation device 1, so that the image formation device 1 can acquire a display screen created in the external server 101 and display the acquired display screen on the operational panel 4. So, by registering the external server 101 with the image formation device 1, a display screen to be displayed on the operational panel 4 can be customized to have an excellent design. The external server 1 may be a server provided by a manufacturer itself that manufacturers and sells the image formation device 1, or a server provided by a third party different from the manufacturer. When the external server 101 is a server provided by a third party different from the manufacturer, the server is categorized into two types: a server provided by an alliance formed with the manufacturer; and a server provided independently of the manufacturer.

The authentication server 102 authenticates the external server 101 from which the image formation device 1 acquires a display screen when the external server 101 is to be registered with the image formation device 1. The authentication server 102 is provided, for example, by a manufacturer itself that manufacturers and sells the image formation device 1. So, the authentication server 102 determines whether the external server 101 to be registered with the image formation device 1 is a server provided by the manufacturer itself, a server provided by a third party in alliance with the manufacturer, or a server provided by a third party having no relation with the manufacturer. Then, the authentication server 102 notifies the image formation device 1 of the server level of the external server 101 showing the reliability level of the external server 101 to be registered with the image formation device 1.

A browser function for displaying a display screen created in the external server 101 on the operational panel 4 is added as an extended function to the image formation device 1. The URL (uniform resource locator) of the external server 101 is registered in advance with the browser function. At this time, the image formation device 1 requests the authentication server 102 to authenticate the external server 101 to be registered, and stores therein a server level received from the authentication server 102. After the external server 101 is registered, the image formation device 1 automatically acquires a display screen created in the external server 101, and displays the acquired display screen on the operational panel 4. As an example, each time a user operates the operational panel 4, the browser function implemented in the image formation device 1 transmits an operation signal to the external server 101, acquires a display screen incorporating the operation by the user from the external server 101, and displays the acquired display screen on the operational panel 4.

The external server 101 sometimes cannot figure out the extended function added to the image formation device 1, particulars of other specifications and the like when creating a display screen to be displayed in the image formation device 1. As an example, when the external server 101 is a server provided by a third party other than the manufacturer, it is very likely that the external server 101 cannot precisely figure out the extended function added to the image formation device 1, particulars of other specifications and the like. So, on a display screen created in the external server 101, an item that cannot be set in the image formation device 1 is shown to be settable, or a combination of two or more items is not allowed to be set simultaneously in the image formation device 1 are shown to be available as a target of simultaneous setting.

In response, when displaying a display screen acquired from the external server 101 on the operational panel 4, the image formation device 1 of the fourth preferred embodiment determines whether or not the display screen contains an invalid setting item. When the display screen contains the invalid setting item, the image formation device 1 executes some image processing on the invalid setting item to create a display screen in which the display style of the invalid setting item has been changed, and displays the created display screen on the operational panel 4.

When the system controller 32 detects generation of an error in a hardware section with a display screen created in the external server 101 being displayed on the image formation device 1, the image formation device 1 transmits error information (such as an error code) corresponding to the generated error to the external server 101. Thus, the image formation device 1 can acquire an error screen from the external server 101, and display the acquired error screen. However, it may be impossible for the external server 101 to recognize the error information transmitted from the image formation device 1. In this case, although an error screen is acquired from the external server 101 and is displayed on the image formation device 1, the precise details of the error or how to take actions against the error cannot be shown to a user suitably. This is probable when the external server 101 has been provided by a third party other than the manufacturer. This is because, if the external server 101 is a server provided by a manufacturer of the image formation device 1 itself, all error information transmitted from the image formation device 1 can be recognized, so that a suitable error screen responsive to the error can be created accordingly. In contrast, if the external server 101 is a server provided by a third party other than the manufacturer, it is sometimes impossible for the external server 101 to recognize error information. In this case, the precise details of the error or how to take actions against the error cannot suitably be shown.

In response, when the system controller 32 detects generation of an error in a hardware section with a display screen created in the external server 101 being displayed, the image formation device 1 of the fourth preferred embodiment determines whether an error screen responsive to the error being acquired from the external server 101 should be displayed, or an error screen created in the application section 37 should be displayed. At this time, based on the server level of the external server 101, the image formation device 1 determines whether or not the external server 101 can create a suitable error screen. The image formation device 1 thereafter switches a display screen to be displayed on the operational panel 4 to an error screen based on a result of the determination.

Figure 22:
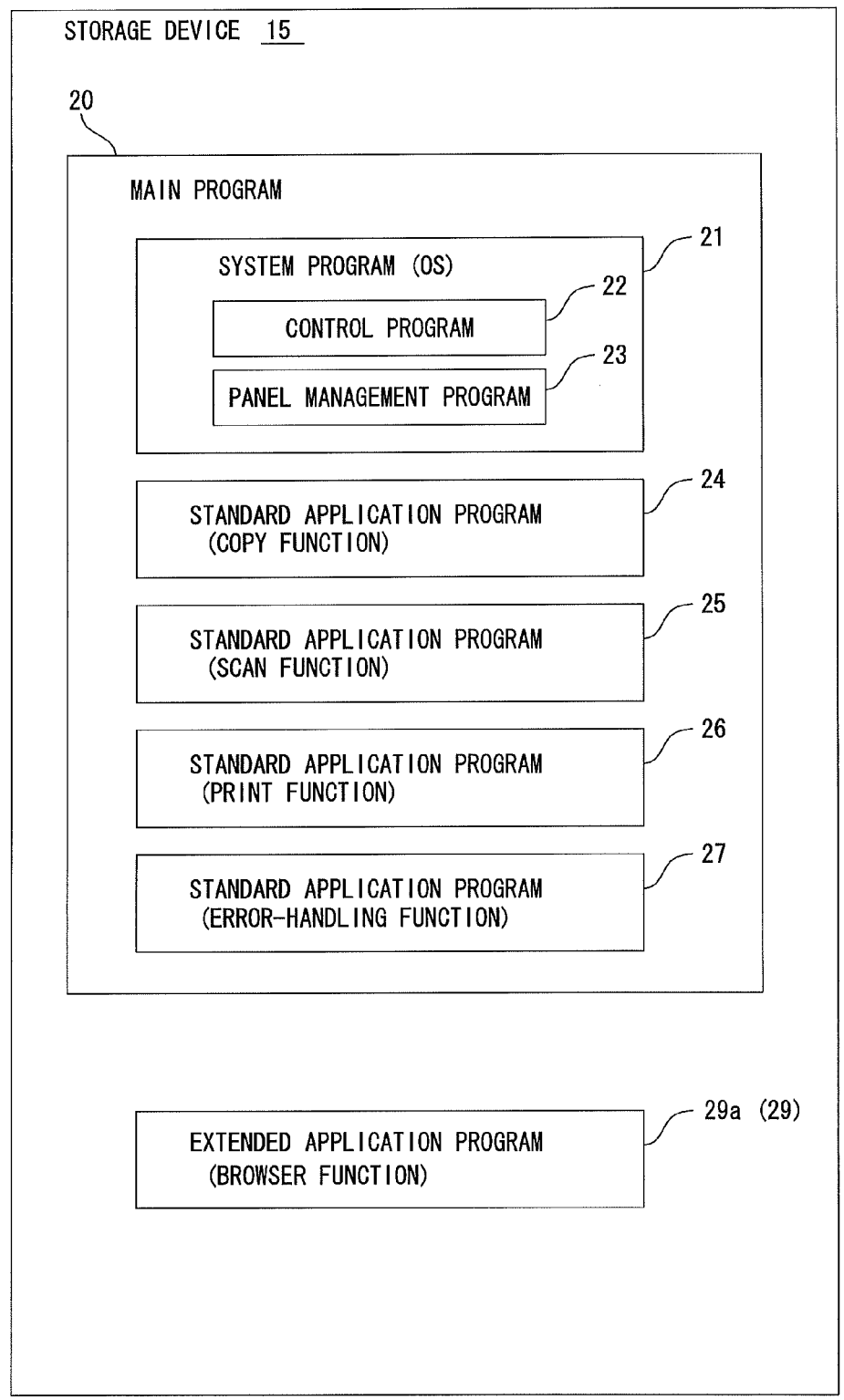
FIG. 22 shows various programs stored in a storage device of the image formation device of the fourth preferred embodiment.

The image formation device 1 of the fourth preferred embodiment is described next in more detail. FIG. 22 shows various programs stored in the storage device 15 of the image formation device 1. In the fourth preferred embodiment, an application program 29*a* corresponding to the browser function is installed as the extending application program 29. In the fourth preferred embodiment, execution of the application program 29*a* realizes the above-described function in the image formation device 1. The main program 20 is the same as that of the first preferred embodiment.

A system configuration described next is in a state where the control computer 10 executes the system program 21, the standard application programs 24 to 27, and the extending application program 29 in the image formation device 1 to which the browser function is added.

Figure 23:
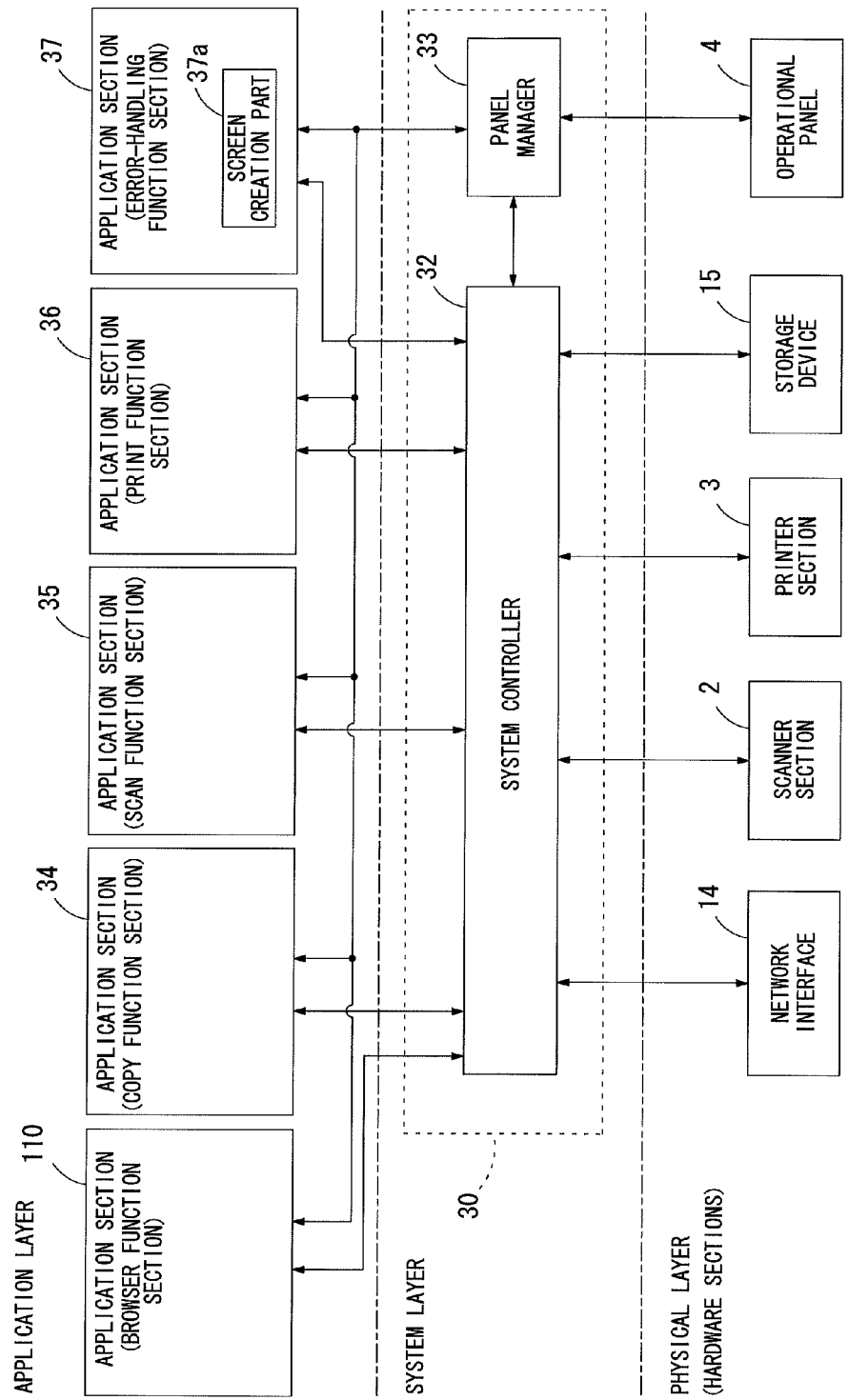
FIG. 23 is a block diagram showing a system configuration of the fourth preferred embodiment after all programs are started in a state where a browser function is added to the image formation device.

FIG. 23 is a block diagram showing a system configuration after all the programs are started in a state where the browser function is added to the image formation device 1. Like in each of the preferred embodiments described above, after each program is started in the image formation device 1, a system with three layers including a physical layer, a system layer and an application layer is configured as shown in FIG. 23. An application section 110 that is a browser function section realized by the extending application program 29 is placed in the application layer higher than the system layer. The application section 110 establishes data communication with the external server 101 through the system controller 32 and the network interface 14 to acquire a display screen to be displayed on the operational panel 4 from the external server 101, and outputs the acquired display screen to the panel manager 33.

Figure 24:
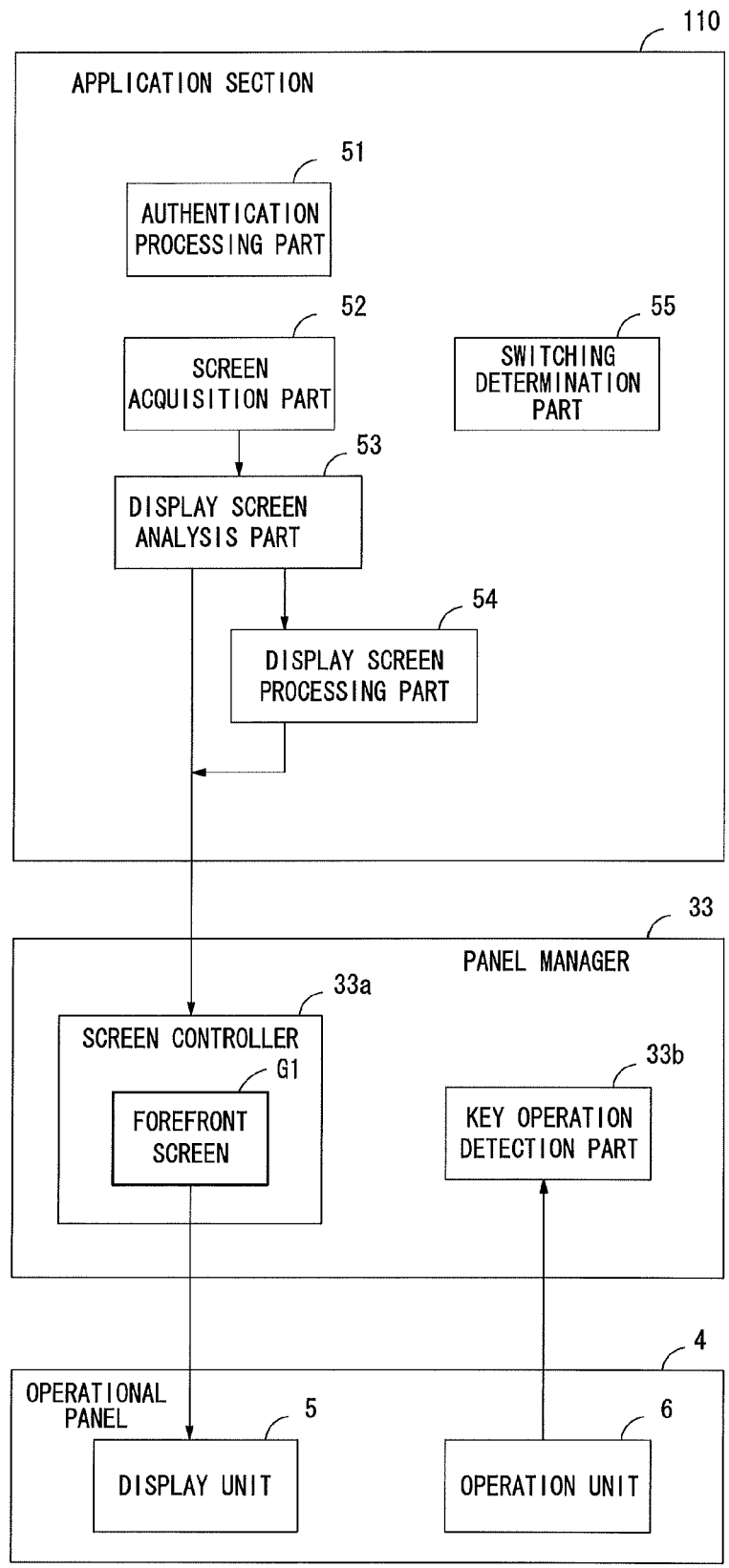
FIG. 24 is a block diagram showing the detailed functional configuration of an application section corresponding to the browser function.

FIG. 24 is a block diagram showing the detailed functional configuration of the application section 110. As shown in FIG. 24, the application section 24 includes an authentication processing part 51, a screen acquisition part 52, a display screen analysis part 53, a display screen processing part 54, and a switching determination part 55.

The authentication processing part 51 registers the external server 101 from which a display screen to be displayed on the operational panel 4 is acquired. For the registration, the authentication processing part 51 establishes data communication with the authentication server 102 to obtain the server level of the external server 101 that is defined in advance in the authentication server 102. That is, once the URL of the external server 101 is registered, the authentication processing part 51 transmits a request for authentication containing the URL to the authentication server 102.

An external server provided by a manufacturer of the image formation device 1 and an external server provided by a third party in alliance with the manufacturer are registered in advance with the authentication server 102 together with their respective URLs. So, as receiving the authentication request transmitted from the image formation device 1, the authentication server 102 determines the server level of the external server 101 based on the URL.

FIG. 25 shows exemplary correlation between the server level and the external server. As an example, the server level of an external server provided by a manufacturer itself of the image formation device 1 is set to the highest level "5." An external server provided by an alliance formed with the manufacturer is set to an intermediate level "3." An external server provided independently of the manufacturer is set to the lowest level "1." The authentication server 102 determines the server level of the external server 101 based on these server levels, and transmits the determined level to the image formation device 1.

The authentication processing part 51 acquires the server level of the external server 101 from the authentication server 102, and stores the acquired server level into the memory 12 or into the storage device shown in FIG. 2.

The screen acquisition part 52 sends a request for a display screen to the external server 101, thereby acquiring a display screen created in the external server 101. As an example, the display screen request sent from the screen acquisition part 52 may contain information regarding the type of the image formation device 1, the extended function added to the image formation device 1, and others. So, the screen acquisition part 52 can acquire a display screen responsive to the type of the image formation device 1 and/or a status regarding the implementation of the extended function. As another example, the external server 101 may contain an individually set URL which creates a suitable display screen in response to the type of the image formation device 1 or to the extended function added to the image formation device 1. In this case, by making access to a URL corresponding to the type of the image formation device 1 or to the extended function added to the image formation device 1, the screen acquisition part 52 can obtain a display screen suitably adjusted for the image formation device 1. However, it is sometimes impossible for the external server 101 to figure out the type of the image formation device 1, the extended function added to the image formation device 1, particulars of other specifications and the like as described above. So, in a display screen acquired by the screen acquisition part 52, a combination of two or more items that is not allowed to be set simultaneously in the image formation device 1 are shown to be available as a target of simultaneous setting.

The display screen thereby acquired by the screen acquisition part 52 relates to various functions installed in the image formation device 1. In more detail, the acquired display screen includes, for example, a display screen relating to the copy function, a display screen relating to the scan function, a display screen relating to the print function, and others. So, unlike the preferred embodiments described above, once the external server 101 is registered with the application section 110, the application sections 34, 35 and 36 are not required to create display screens. However, like in the preferred embodiments described above, the application section 37 as the error-handling function section creates an error screen.

After acquiring a display screen from the external server 101, the screen acquisition part 52 outputs the acquired display screen to the display screen analysis part 53.

The display screen analysis part 53 analyzes a display screen the screen acquisition part 52 acquired from the external server 101. A user makes various settings on the display screen the screen acquisition part 52 acquired from the external server 101 when using a certain function such as the copy function, the scan function, the print function or the like. The display screen analysis part 53 analyzes the display screen to determine whether or not the display screen includes a setting item that cannot be set in the image formation device 1. For this analysis, the display screen analysis part 53 makes communication with the system controller 32, or with the application section 34, or 36 to determine whether each setting item included in the display screen is available or not. When the display screen acquired from the external server 101 is found to include an unavailable setting item as a result of the analysis, the display screen analysis part 53 outputs the acquired display screen to the display screen processing part 54. When the display screen acquired from the external server 101 is found not to include an unavailable setting item, the display screen analysis part 53 outputs the acquired display screen as it is to the screen controller 33a of the panel manager 33.

The display screen analysis part 53 may analyze a display screen based on the server level of the external server 101. As an example, when the external server 101 has its server level as "5", the server is provided by the manufacturer itself. In this case, a display screen acquired from the external server 101 is considered to have a structure that precisely incorporates the type of the image formation device 1, the extended function added to the image formation device 1, the particulars of other specifications and the like. So, this display screen may directly be output to the screen controller 33a of the panel manager 33 without determining whether or not the display screen includes a setting item that cannot be set in the image formation device 1. In contrast, if the external server 101 has its server level as "3" or "1", the server is provided by a third party other than the manufacturer. In this case, it is likely that a display screen acquired from the external server 101 does not precisely incorporate the type of the image formation device 1, the extended function added to the image formation device 1, the particulars of other specifications and the like. So, the above-described analysis may be executed in this case.

With the above-described structure, the external server 101 provided by the manufacturer itself can create a display screen to be displayed on the operational panel 4 of the image formation device 1 without any constraints. Here, it is assumed that a setting item that may be a disadvantage for a user is set not to appear on a display screen created inside the image formation device 1, for example. Even in this case, by creating a display screen including this setting item and sending the created display screen to the image formation device 1, the external server 101 provided by the manufacturer can intentionally make the display screen including the setting item that may be a disadvantage for the user to be displayed.

The display screen processing part 54 executes some image processing on an unavailable setting item included in a display screen the screen acquisition part 52 acquired from the external server 101, thereby creating a display screen in which the display style of the unavailable setting item has been changed. As an example, the display screen processing part 54 may gray out the unavailable setting item, or may even delete the setting item itself not to show. The display screen processing part 54 thereafter outputs the display screen including the unavailable setting item whose display style has been changed to the screen controller 33a of the panel manager 33.

Figure 26:
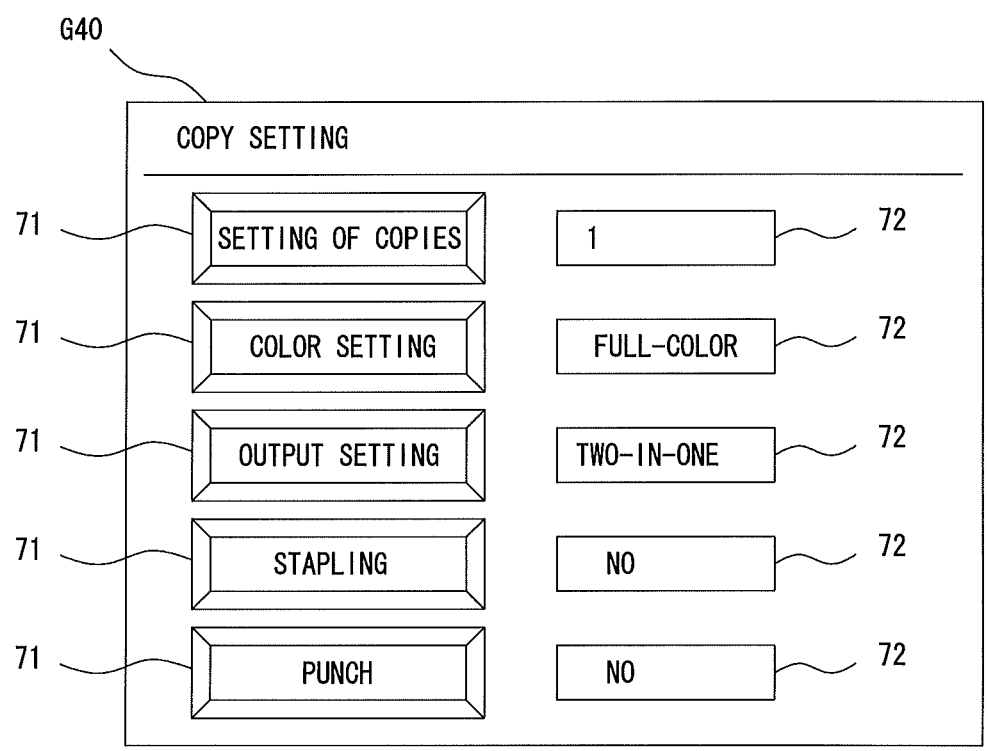
FIG. 26 shows an exemplary display screen relating to a copy function acquired from the external server.

The details of processing executed by the display screen analysis part 53 and the display screen processing part 54 are described next. FIG. 26 shows an exemplary a display screen G40 relating to the copy function the screen acquisition part 52 acquired from the external server 101. Setting items relating to the copy function include setting of the number of copies, color setting, output setting, staple setting, and punch setting. A plurality of operation keys 71 provided for the corresponding setting items are displayed on the display screen G40. Further, set value display fields 72 showing the current set values of the corresponding setting items are displayed to the right side of the operation keys 71 on the display screen G40. Each of the operation keys 71 is an image contained in the display screen G40. Identifying information indicating what kind of setting item it is corresponding to each of the operation keys 71 is given to every image of each of the operation keys 71. So, by referring to such identifying information, it can be found in which part of the display screen G40 that each of the operation keys 71 for operating the corresponding setting item is displayed. The set value display fields 72 each includes text information indicating the current set value of the corresponding setting item. So, by referring to such text information, it can be seen which setting has been made for each setting item.

By referring to identifying information contained in the display screen G40, the display screen analysis part 53 determines whether or not each of the operation keys 71 on the display screen G40 is a setting item that can be set in the image formation device 1, or is a setting item that cannot be set in the image formation device 1. By way of example, when a staple function and a punch function are not implemented in the image formation device 1, the display screen analysis part 53 makes such a determination so that the two operation keys 71 for the staple and punch settings are specified as available setting items.

In this case, the display screen processing part 54 executes image processing on the images of the two operation keys 71 for the staple and punch settings contained in the display screen G40, so that these two operation keys 71 are displayed in different styles showing that they are not selectable. The display screen processing part 54 executes the same image processing on the set value display fields 72 corresponding to these setting items.

Figure 27:
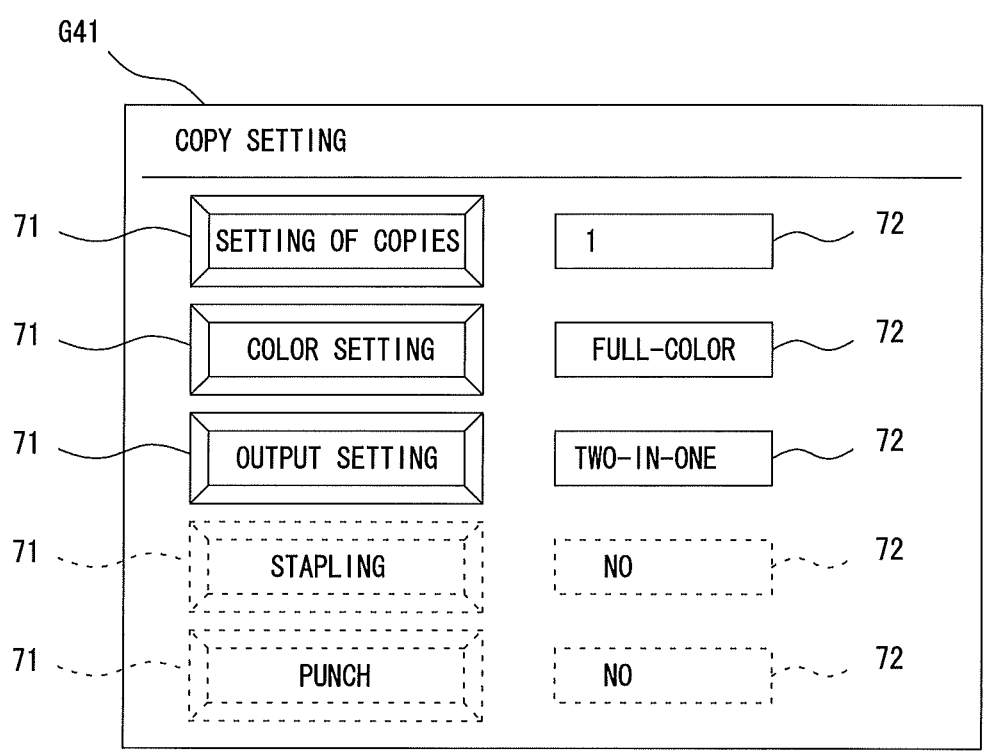
FIG. 27 shows an exemplary display screen created by processing a display screen.

FIG. 27 shows an exemplary display screen G41 the display screen processing part 54 created by processing the display screen shown in FIG. 26. As described above, when the two operation keys 71 for the staple and punch settings are unavailable setting items, the display screen processing part 54 executes image processing on the two operation keys 71 and the two set value display fields 72 for the staple and punch settings, thereby creating the display screen G41 as shown in FIG. 27. In the display screen G41 shown in FIG. 27, the two operation keys 71 for the staple and punch settings and their corresponding set value display fields 72 are grayed out, for example. The display screen G41 is then displayed on the display unit 5 of the operational panel 4 under control of the panel manager 33. By referring to the display screen G41 thereby displayed, a user can find that he or she cannot make a setting operation on the two setting items for the staple and punch settings that are part of the plurality of setting items (operation keys 71) shown in the display screen G41.

The display screen analysis part 53 figures out which setting has been made for each setting item, and exercises control in order to prevent setting items that are not allowed to make the simultaneous setting in the image formation device 1 from being set simultaneously. As an example, in a situation where the staple and punch functions are implemented in the image formation device 1 and these functions are not simultaneously available, one function is made available while the other function is made unavailable. So, when a display screen acquired from the external server 101 contains setting items that cannot be set simultaneously, the display screen analysis part 53 outputs the acquired display screen to the display screen processing part 54. Then, the display screen processing part 54 executes the same image processing as that described above on the setting items that are not allowed to be set simultaneously, thereby changing the display styles of these setting items.

Figure 28:
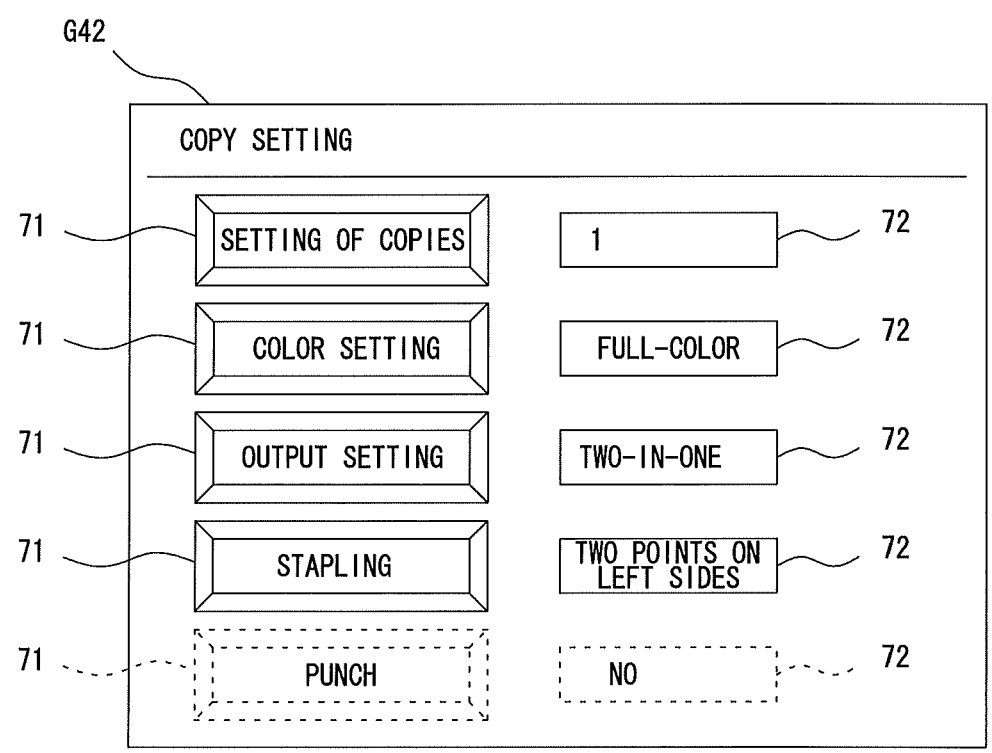
FIG. 28 shows another exemplary display screen.

FIG. 28 shows another exemplary display screen G42 created in the display screen processing part 54. It is assumed that, in a situation where the staple and punch functions cannot be used simultaneously in the image formation device 1, a setting made in the staple setting to staple at two points on the left sides of sheets. In this case, as described above, the display screen processing part 54 executes image processing on one of the operation keys 71 and its corresponding one of the set value display fields 72 for the punch setting that cannot be set simultaneously with the staple setting, thereby creating the display screen G42 shown in FIG. 28. In the display screen G42 of FIG. 28, as a result of the setting made in the staple setting, one of the operation keys 71 and its corresponding one of the set value display fields 72 for the punch function that cannot be used simultaneously with the staple function are grayed out, for example. The display screen G42 is then displayed on the display unit 5 of the operational panel 4 under control of the panel manager 33. By referring to the display screen G42 thereby displayed, a user can find that he or she cannot make a setting operation on the setting item for the punch setting that is one of the plurality of setting items (operation keys 71) shown in the display screen G42. So, the user knows that he or she cannot punch holes in sheets to be output from the image formation device 1 together with the stapling of the sheets.

As described, the display screen analysis part 53 analyzes a display screen the screen acquisition part 52 acquired from external server 101, and the display screen processing part 54 executes image processing on a setting item as required. This makes a display screen to be output to the screen controller 33a of the panel manager 33 adjusted to the image formation device 1.

In the fourth preferred embodiment, once the application section 110 as the browser function section is added, the screen controller 33a accordingly makes a display screen output from the application section 110 active as the display screen G1 at the forefront. Then, the screen controller 33a outputs the active display screen to the display unit 5. So, a display screen acquired from the external server 101 is displayed on the display unit 5 of the operational panel 4, and a user can operate the operational panel 4 with viewing the contents on the display screen.

Like in the first preferred embodiment, as receiving a notification of error generation from the system controller 32 while displaying a display screen acquired from the external server 101 on the display unit 5 of the operational panel 4, the panel manager 33 requests the application section 37 as the error-handling function section to create a display screen responsive to the details of a generated error. Thus, the panel manager 33 can hold an error screen responsive to the generated error as a background display screen.

At the time of error generation, the panel manager 33 outputs a request for a determination as to screen switching to the application section 110 in order to make an inquiry at the application section 110 whether or not a display screen to be displayed on the display unit 5 of the operational panel 4 should be switched to the error screen created in the application section 37.

In response to the switching determination request, the switching determination part 55 of the application section 110 determines whether an error screen to be displayed on the operational panel 4 at the time of error generation should be the one acquired from the external server 101, or the error screen created in the application section 37 should be displayed.

Like in the second preferred embodiment, the panel manager 33 of the fourth preferred embodiment conducts an error assessment at the time of generation of an error to determine the level of the error. FIG. 29 shows exemplary error levels determined by the error assessment of the fourth preferred embodiment. In the fourth preferred embodiment as illustrated in FIG. 29, when an error generated in the image formation device 1 is a serious error such as the shutdown of a cooling fan or the physical damage of the storage device 15, for example, the level of the error is set to "4." When an error generated in the image formation device 1 is a relatively minor error such as a shortage of sheets, a toner shortage or sheet jam, for example, the level of the error is set to "2" as shown in FIG. 29. The panel manager 33 conducts an error assessment to determine the level of the generated error based on these error levels. Further, the panel manager 33 incorporates the determined error level to a request for a determination as to switching, and outputs the request to the switching determination part 55 of the application section 110.

As receiving the switching determination request from the panel manager 33, the switching determination part 55 compares the error level and a server level to determine whether an error screen acquired from the external server 101 should be displayed, or the error screen created in the application section 37 should be displayed. To be more specific, the switching determination part 55 determines that an error screen to be displayed should be acquired from the external server 101 when the server level is higher than the error level. On the other hand, the switching determination part 55 determines that an error screen created in the application section 37 should be displayed when the error level is higher than the server level. The switching determination part 55 controls the screen controller 33*a* based on a result of the determination, thereby switching a display screen to be displayed on the display unit 5 to an error screen responsive to the error.

When the switching determination part 55 determines that an error screen to be displayed should be acquired from the external server 101, the screen acquisition part 52 transmits error information corresponding to an error generated in the image formation device 1 to the external server 101. Then, the screen acquisition part 55 acquires an error screen responsive to the error from the external server 101, and outputs the acquired error screen to the screen controller 33*a*. As a result, the error screen acquired from the external server 101 is displayed on the display unit 5. At this time, it is preferable that the display screen analysis part 53 and the display screen processing part 54 do not execute their respective processing described above.

When the switching determination part 55 determines that an error screen created in the application section 37 should be displayed, the screen controller 33 moves an error screen prepared in advance as a background display screen so that the error screen is positioned at the forefront as the display screen G1. As a result, the error screen created in the application section 37 is displayed on the display unit 5.

As an example, the external server 101 has its server level as "5", when the server is provided by the manufacturer. So, an error screen acquired from the external server 101 is displayed regardless of which kind of error has been generated in the image formation device 1. This is because, the external server 101 provided by the manufacturer has a high level of reliability and precisely figures information of an error transmitted from the image formation device 1 out, so that a suitable error screen responsive to the error can be created. In this case, as an error screen acquired from the external server 101 is displayed regardless of an error level, screen design uniformity is maintained between a display screen previously displayed and the displayed error screen.

As another example, the external server 101 has its server level as "3" when the server is provided by a third party in alliance with the manufacturer. So, an error screen acquired from the external server 101 is displayed when the error level of an error generated in the image formation device 1 is "2." An error screen created in the application section 37 is displayed when the error level of the error generated in the image formation device 1 is "4." This is because, the external server 101 provided by a third party in alliance with the manufacturer has a certain degree of reliability according to such as a contract made with the manufacturer. So, the external server 101 is allowed to create a suitable error screen based on information of an error transmitted from the image formation device 1 for a minor error. Accordingly, an error screen acquired from the external server 101 is displayed when a minor error is generated in the image formation device 1, so that screen design uniformity is maintained between a display screen previously displayed and the displayed error screen. In contrast, even when the external server 101 is a server provided by a third party in alliance with the manufacturer, a user should be prompted to immediately take appropriate actions when an error generated in the image formation device 1 is a serious error. In this case, an error screen created inside the image formation device 1 is displayed, so the user can take appropriate action against the generated error.

As still another example, the external server 101 has its server level as "1" when the server is provided by a third party having no relation with the manufacturer. So, an error screen created in the application section 37 is displayed for every error generated in the image formation device 1. This is because, the external server 101 provided by a third party having no relation with the manufacturer has poor reliability, and is considered to be incapable of figuring out information of an error transmitted from the image formation device 1 and creating a suitable error screen responsive to the error. In this case, regardless of an error level, an error screen created in the application section 37 is displayed and an error screen is not acquired from the external server 101. So, the error screen with a high level of reliability is displayed. In this case, while screen design uniformity is broken every time error is generated, a suitable error screen can be displayed. As a result, a user can immediately take appropriate action against the generated error.

Described next is the operation of the application section 110 in the image formation device 1 of the fourth preferred embodiment.

Figure 30:
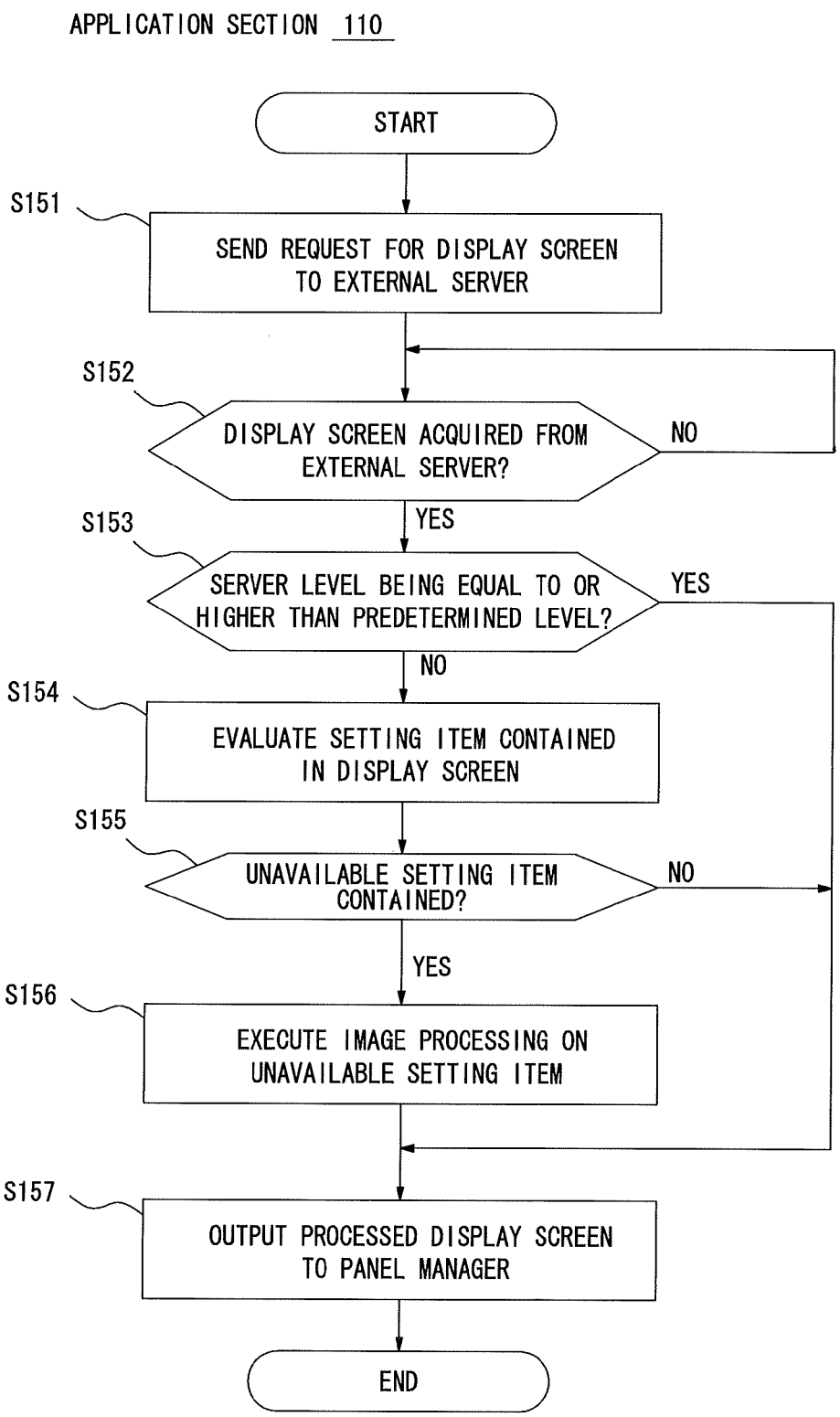
FIG. 30 is a flow diagram explaining an exemplary procedure of a processing executed by the application section in order to acquire a display screen from the external server and to output the acquired display screen.

FIG. 30 is a flow diagram explaining an exemplary procedure of a processing executed by the application section 110 in order to acquire a display screen from the external server 101 registered in advance and to output the acquired display screen. In order to display a display screen on the display unit 5, the application section 110 sends a request for a display screen to the external server 101 (step S151). In response to the request, the external server 101 transmits a display screen.

The application section 110 is placed in a standby state until it acquires a display screen from the external server 101 (step S152). When the display screen is acquired (when a result of step S152 is YES), the application section 110 determines whether the server level of the external server 101 is equal to or higher than a predetermined level (step S153). As an example, the application section 110 determines whether or not the server level is equal to or higher than "5." When the server level is not equal to or is lower than the predetermined level (when a result of step S153 is NO), the application section 110 evaluates setting items contained in the acquired display screen (step S154) to determine whether or not the display screen contains an unavailable setting item (step S155). Here, the existence or nonexistence of setting items which cannot be set simultaneously is also determined. When an unavailable setting item is contained (when a result of step S155 is YES), the application section 110 executes image processing on the unavailable setting item (step S156), and outputs the processed display screen to the panel manager 33 (step S157).

In contrast, when the server level of the external server 101 is equal to or higher than the predetermined level (when a result of step S153 is YES), steps S154 to S156 are bypassed so that the acquired display screen is output as it is to the panel manager 33 (step S157). When an unavailable setting item is not contained (when a result of step S155 is NO), step S156 is bypassed so the acquired display screen is output as it is to the panel manager 33 (step S157).

By the above-described processing executed by the application section 110, the image formation device 1 is allowed to display a display screen acquired from the external server 101 on the operational panel 4. The image formation device 1 is even allowed to display a display screen of an excellent design. At this time, a setting item that cannot be set in the image formation device 1 is displayed such as in a grayed-out mode as a result of processing executed thereon. So, a display screen suitably adjusted for the image formation device 1 can be displayed while the excellent design performance of the displayed screen is maintained.

Figure 31:
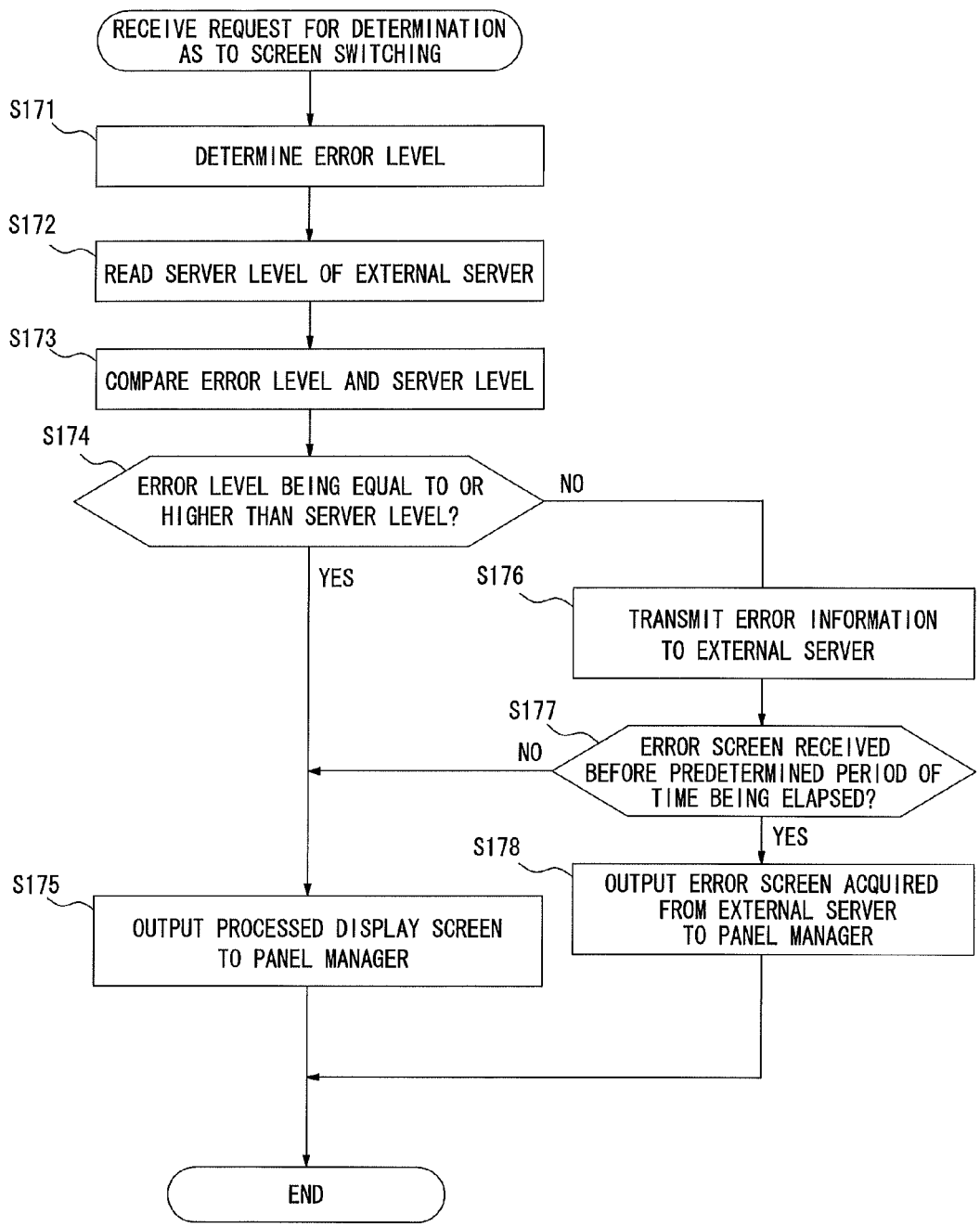
FIG. 31 is a flow diagram explaining an exemplary procedure of a processing executed by the application section when an error is generated in the image formation device.

FIG. 31 is a flow diagram explaining an exemplary procedure of a processing executed by the application section 110 when an error is generated in the image formation device 1. By way of example, the application section 110 receives a request for a determination as to switching from the panel manager 33 to start this processing. After the processing is started, the application section 110 first determines the level of an error generated in the image formation device 1 (step S171). Then, the application section 110 reads the server level of the external server 110 (step S172), and compares the error level and the server level (step S173). When the error level is higher than the server level (when a result of step S174 is YES), the application section 110 outputs instructions for screen switching to the panel manager 33 (step S175). Then, the panel manager 33 moves an error screen that has been created in the application section 37 in response to error generation. As a result, the error screen is positioned at the forefront as the display screen G1, and is displayed on the display unit 5.

In contrast, when the error level is lower than the server level (when a result of step S174 is NO), the application section 110 transmits error information to the external server 101 (step S176). In response, the external server 101 creates an error screen responsive to the error information, and transmits the created error screen to the image formation device 1. At this time, it is sometimes impossible for the external server 101 to recognize the error information. In this case, the external server 101 cannot transmit an error screen to the image formation device 1. So, after transmission of the error information, the application section 110 is put on standby for receiving an error screen from the external server 101 until a predetermined period of time has elapsed (step S177). When an error screen is received from the external server 101 before the elapse of the predetermined period of time (when a result of step S177 is YES), the application section 110 outputs the error screen acquired from the external server 101 to the panel manager 33 on the receipt of the error screen (step S178). Then, the panel manager 33 displays the error screen created in the external server 101 on the display unit 5.

In contrast, when an error screen is not received before the elapse of the predetermined period of time (when a result of step S177 is NO), the application section 110 outputs instructions for screen switching to the panel manager 33 (step S175). Then, the panel manager 33 displays the error screen created in the application section 37 in response to error generation on the display unit 5.

By the above-described processing executed by the application section 110 in response to an error generated in the image formation device 1, an error screen is displayed on the operational panel 4 of the image formation device 1. In the processing described above, firstly, it is determined whether or not the external server 101 can create a suitable error screen. Next, it is determined whether an error screen to be displayed should be acquired from the external server 101, or an error screen created in the application section 37 should be displayed. As a result, an error screen displayed on the display unit 5 is suitably responsive to the error.

As described above, the image formation device 1 of the fourth preferred embodiment can display a display screen created in the external server 101 on the display unit 5 of the operational panel 4. So, a user can freely change the design of a display screen to be displayed on the display unit 5 of the operational panel 4.

Further, when a display screen created in the external server 101 is displayed on the image formation device 1, the image formation device 1 determines whether or not the display screen contains an unavailable setting item. The image formation device 1 executes some image processing on the unavailable setting item, and displays a display screen in which the display style of the unavailable setting item has been changed. This prevents a user from making a setting operation on an unavailable setting item, or simultaneously making setting operations on setting items which are not available as targets of the simultaneous setting before these happen. As a result, user's operability in operating the operational panel 4 is improved.

MODIFICATIONS

While the preferred embodiments of the present invention have been described above, the present invention is not intended to be confined to the details shown above.

As an example, while being described as the application section 37 that operates in the application layer in the system configuration of the above-described preferred embodiments, the error-handling function section may be incorporated in the operating system 30.

In the preferred embodiments described above, the system controller 32 and the panel manager 33 are shown to be separated in the operating system 30 for the convenience of description. However, the system controller 32 and the panel manager 33 are not necessarily separated distinctly. As an example, a part of the system controller 32 may have the above-described function of the panel manager 33.

In the preferred embodiments described above, an event occurring in the image formation device 1 is shown to be an error. However, an event is not necessarily an error. As an example, an event to be detected may be the reduction of the available space of the storage 15 to a level lower than a certain level. Or, still another event may be detected in the image formation device 1.

The above-described preferred embodiments are intended for switching control of a display screen to be displayed on the operational panel 4 of the image formation device 1. The switching control as described may be applied as switching control of a display screen on a display unit of a different device other than the image formation device 1, as long as the different device has a display unit.

While the invention has been shown and described in detail, the foregoing description is in all aspects illustrative and not restrictive. It is therefore understood that numerous modifications and variations can be devised without departing from the scope of the invention.

What is claimed is:

1. An image formation device, comprising:
    a display unit capable of displaying various types of information;
    a screen controller for controlling switching of a display screen to be displayed on said display unit;
    a hardware section for executing a specific function;
    a system controller for controlling said hardware section; and
    an application section for executing said specific function by putting said hardware section into operation through said system controller, and for creating a display screen relating to said specific function, said application section including a standard application section that executes standard functions installed in advance, and an extension application section that executes extension functions which are additionally implemented, and
    when said system controller detects the occurrence of an event in said hardware section with said display screen created in said standard application section being displayed on said display unit, said screen controller determines whether or not switching of a display screen to be displayed on said display unit should be made said detected event, and
    when said system controller detects the occurrence of said event in said hardware section with said display screen created in said extension application section being displayed on said display unit, said screen controller requests said extension application section to determine whether or not switching of the display screen to be displayed on said display unit should be made, and controls switching of the display screen to be displayed on said display unit based on a result of the determination made by said extension application section,
    wherein said event is an error generated in said hardware section; and
    when said system controller detects generation of said error with said display screen created in said extension application section being displayed on said display unit, said screen controller determines the level of said error, and switches a display screen to be displayed on said display unit to an error screen when said level is higher than a predetermined level, while requesting said extension application section to determine whether or not switching of a display screen to be displayed on said display unit should be made when said level is lower than said predetermined level.

2. The image formation device according to claim 1, wherein
    said screen controller manages several display screens including an active display screen to be displayed on said display unit and a background display screen not to be displayed on said display unit, and holds a display screen responsive to the details of said event as said background display screen when said system controller detects the occurrence of said event in said hardware section.

3. The image formation device according to claim 1, wherein
    said screen controller switches a display screen to be displayed on said display unit from said display screen created in said extension application section to a display screen responsive to the details of said event when said result of the determination made by said extension application section is to give instructions to switch a display screen to be displayed on said display unit.

4. The image formation device according to claim 2, wherein
    said screen controller switches a display screen to be displayed on said display unit to said background display screen when said result of the determination made by said extension application section is to give instructions to switch a display screen to be displayed on said display unit.

5. The image formation device according to claim 1, wherein
    when said result of the determination made by said extension application section is not to give instructions to switch a display screen to be displayed on said display unit, said screen controller continues to display said display screen created in said extension application section on said display unit, and switches a display screen to be displayed on said display unit to a display screen responsive to the details of said event when said extension application section completes execution of said specific function.

6. The image formation device according to claim 2, wherein
    when said result of the determination made by said extension application section is not to give instructions to switch a display screen to be displayed on said display unit, said screen controller continues to display said display screen created in said extension application section on said display unit, and switches a display screen to be displayed on said display unit to said display screen responsive to the details of said event when said extension application section completes execution of said specific function.

7. An image formation device, comprising:
    a display unit capable of displaying various types of information;
    a screen controller for switching a display screen to be displayed on said display unit;
    a hardware section for executing a specific function;
    a system controller for controlling said hardware section;
    a screen creation part for creating an error screen responsive to an error generated in said hardware section, and for outputting said error screen to said screen controller;
    an application section for executing said specific function by putting said hardware section into operation through said system controller;
    a screen acquisition part for acquiring, from an external server with which said hardware section can communicate through said system controller, a display screen to be displayed on said display unit when said specific function is executed, and for outputting the acquired display screen to said screen controller; and a switching determination part for determining whether an error screen to be displayed responsive to said error should be acquired from said external server by said screen acquisition part, or said error screen responsive to said error created in said screen creation part should be displayed, and for switching a display screen to be displayed on said display unit to the error screen by controlling said screen controller based on a result of its determination, said determination and the switching being made when said system controller detects generation of said error in said hardware section with said display screen acquired by said screen acquisition part being displayed on said display unit, wherein said switching determination part determines whether said error screen should be acquired from said external server by said screen acquisition part, or said error screen created in said screen creation part should be displayed, based on a server level of said external server and an error level of said occurred error; and when said system controller detects generation of said error with said display screen created in said application section being displayed on said display unit, said screen controller determines the level of said error, and switches a display screen to be displayed on said display unit to an error screen when said level is higher than a predetermined level, while requesting said application section to determine whether or not switching of a display screen to be displayed on said display unit should be made when said level is lower than said predetermined level.

8. A display screen switching method of making a selective switching among display screens created in a plurality of application sections including a standard application section that executes standard functions installed in advance, and an extension application section that executes extension functions which are additionally implemented, and displaying the switched display screen on a display unit, the method comprising the steps of:

(a) acquiring a display screen created in an application section selected from said plurality of application sections, and displaying the acquired display screen on said display unit;

(b) detecting the occurrence of an event with said display screen created in the selected application section being displayed on said display unit;

(c) determining whether or not switching of a display screen to be displayed on said display unit should be made based on said event when the occurrence of said event is detected with said display screen created by said standard application section being displayed on said display unit;

(d) requesting said extension application section to determine whether or not switching of the display screen to be displayed on said display unit should be made, and obtaining a result of the determination made by said extension application section when the occurrence of said event is detected with said display screen created by said extension application section being displayed on said display unit;

(e) controlling switching of the display screen to be displayed on said display unit based on the result of the determination about the switching made in said step (c) or (d);

said event is an error generated in a hardware section for executing a specific function; and (f) when generation of said error is detected in said hardware section with said display screen created in said extension application section being displayed on said display unit, determining the level of said error, and switching a display screen to be displayed on said display unit to an error screen when said level is higher than a predetermined level, while requesting said extension application section to determine whether or not switching of a display screen to be displayed on said display unit should be made when said level is lower than said predetermined level.

9. The display screen switching method according to claim 8, further comprising the step of:

(d) preparing a display screen responsive to the details of said event as a background display screen when the occurrence of said event is detected.

10. The display screen switching method according to claim 8, wherein in said step (c), when said result of the determination made by said extension application section is to give instructions to switch a display screen to be displayed on said display unit, a display screen to be displayed on said display unit is switched from said display screen created in said extension application section to a display screen responsive to the details of said event.

11. The display screen switching method according to claim 9, wherein in said step (c), when said result of the determination made by said extension application section is to give instructions to switch a display screen to be displayed on said display unit, a display screen to be displayed on said display unit is switched to said background display screen.

12. The display screen switching method according to claim 8, wherein in said step (c), when said result of the determination made by said extension application section is not to give instructions to switch a display screen to be displayed on said display unit, said display screen created in said extension application section continues to be displayed on said display unit, and a display screen to be displayed on said display unit is switched to a display screen responsive to the details of said event when said extension application section completes execution of a specific function.

13. A non-transitory computer readable medium storing a program executed by a computer to make a selective switching among display screens created in a plurality of application sections including a standard application section that executes standard functions installed in advance, and an extension application section that executes extension functions which are additionally implemented, and to display the switched display screen on a display unit, said program causing said computer to execute processing comprising the steps of:

acquiring a display screen created in an application section selected from said plurality of application sections, and displaying the acquired display screen on said display unit;

detecting the occurrence of an event with said display screen created in the selected application section being displayed on said display unit determining whether or not switching of a display screen to be displayed on said display unit should be made based on said event when the occurrence of said event is detected with said display screen created by said standard application section being displayed on said display unit;

requesting said extension application section to determine whether or not switching of the display screen to be displayed on said display unit should be made, and obtaining a result of the determination made by said extension application section when the occurrence of said event is detected with said display screen created by said extension application section being displayed on said display unit;

controlling switching of the display screen to be displayed on said display unit based on the result of the determination about the switching made in said determining step or said requesting step;

said event is an error generated in a hardware section for executing a specific function; and when generation of said error is detected in said hardware section with said display screen created in said extension application section being displayed on said display unit, determining the level of said error, and switching a display screen to be displayed on said display unit to an error screen when said level is higher than a predetermined level, while requesting said extension application section to determine whether or not switching of a display screen to be displayed on said display unit should be made when said level is lower than said predetermined level.

14. The image formation device according to claim 1, wherein the extension application section determines whether or not switching of a display screen to be displayed should be made by analyzing information of the specific function that affects execution of the specific function.

15. The image formation device according to claim 7, further comprising:
a display screen processing part for creating a display screen in which the display style of a setting item is changed by executing some image processing on said setting item, and for outputting the created display screen to said screen controller when said setting item contained in said display screen acquired by said screen acquisition part cannot be set when said specific function is executed.

* * * * *